United States Patent
Singer et al.

(10) Patent No.: US 12,545,851 B2
(45) Date of Patent: Feb. 10, 2026

(54) FRAGRANCES WITH NOTE OF LILY OF THE VALLEY

(71) Applicant: SYMRISE AG, Holzminden (DE)

(72) Inventors: Emilie Singer, Holzminden (DE); Bernd Holscher, Halte (DE)

(73) Assignee: SYMRISE AG, Holzminden (DE)

(*) Notice: Subject to any disclaimer, the term of this patent is extended or adjusted under 35 U.S.C. 154(b) by 173 days.

(21) Appl. No.: 18/231,957

(22) Filed: Aug. 9, 2023

(65) Prior Publication Data

US 2024/0084216 A1    Mar. 14, 2024

Related U.S. Application Data

(63) Continuation of application No. 13/645,871, filed on Oct. 5, 2012, now abandoned.
(Continued)

(30) Foreign Application Priority Data

Oct. 7, 2011    (EP) .................................. 11184441

(51) Int. Cl.
*A61Q 13/00*    (2006.01)
*A61K 8/35*    (2006.01)
(Continued)

(52) U.S. Cl.
CPC .............. *C11B 9/0034* (2013.01); *A61K 8/35* (2013.01); *A61Q 13/00* (2013.01); *C07C 47/225* (2013.01);
(Continued)

(58) Field of Classification Search
CPC .......... C11D 3/50; C11B 9/34; C11B 9/0034; A61K 8/35; A61Q 13/00; A61Q 5/02;
(Continued)

(56) References Cited

U.S. PATENT DOCUMENTS 4,910,346 A * 3/1990 Chalk ..................... C07C 45/50
                                                512/27
6,376,458 B1    4/2002 Winter

FOREIGN PATENT DOCUMENTS

EP    1529770 A1    8/2011
EP    2333038 A1    6/2012
(Continued)

OTHER PUBLICATIONS

Lalande R. et al., "Addition Radicalaire de Pethanol et de l'ethanal sur le beta-Pinene", Comptes Rendus Hebdomadaires des Seances de l'academie Dessciences, Serie C: Sciences Chimiques, vol. 264, No. 12, 1967 pp. 1083-1086.
(Continued)

*Primary Examiner* — Rayna Rodriguez
(74) *Attorney, Agent, or Firm* — Dilworth & Barrese, LLP

(57) ABSTRACT

A compound of formula (I) is described

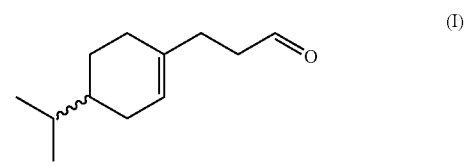

and use thereof as fragrance, especially as lily-of-the-valley fragrance and/or as an agent for increasing the substantivity and/or the retention of a fragrance preparation and/or as a fixative.

9 Claims, 1 Drawing Sheet

Related U.S. Application Data

(60) Provisional application No. 61/544,904, filed on Oct. 7, 2011.

(51) Int. Cl.

| | | |
|---|---|---|
| *C07C 47/225* | (2006.01) | |
| *C11B 9/00* | (2006.01) | |
| *C11C 5/00* | (2006.01) | |
| *C11D 3/50* | (2006.01) | |
| *A61Q 5/02* | (2006.01) | |
| *A61Q 5/06* | (2006.01) | |
| *A61Q 5/10* | (2006.01) | |
| *A61Q 5/12* | (2006.01) | |
| *A61Q 15/00* | (2006.01) | |
| *A61Q 17/04* | (2006.01) | |
| *A61Q 19/00* | (2006.01) | |
| *A61Q 19/10* | (2006.01) | |

(52) U.S. Cl.
CPC ............... *C11C 5/004* (2013.01); *C11D 3/50* (2013.01); *A61Q 5/02* (2013.01); *A61Q 5/065* (2013.01); *A61Q 5/10* (2013.01); *A61Q 5/12* (2013.01); *A61Q 15/00* (2013.01); *A61Q 17/04* (2013.01); *A61Q 19/00* (2013.01); *A61Q 19/10* (2013.01); *C07C 2601/16* (2017.05)

(58) Field of Classification Search
CPC . A61Q 5/065; A61Q 5/10; A61Q 5/12; A61Q 15/00; A61Q 17/04; A61Q 19/00; A61Q 19/10; C07C 47/225; C07C 2601/16; C11C 5/004

See application file for complete search history.

(56) References Cited

FOREIGN PATENT DOCUMENTS

| | | |
|---|---|---|
| JP | 50094143 A | 7/1975 |
| WO | 2004089861 A1 | 10/2004 |
| WO | 2011/029743 A1 | 3/2011 |

OTHER PUBLICATIONS

Maillard B. et al., "Additions Radicalaires. I.—Additions de Dioxolannes au beta-pinene", Bulletin de la societe Chimique de france. 1 partie—chimie Analytique, Minerale et Physique, Societe Francaise de chime., No. 4, 1973, pp. 1368-1372.

European Search Report, European Application No. 11184441.1, dated Mar. 16, 2012.

Skouroumounis et al ("Synthesis of 1,3,4,5-Tetrahydro-2-benzoxepin Derivatives as Conformationally Restricted Analogues of Cyclamenaldehyde-Type Compounds and as Intermediates for Highly Odour-Active Homologues." Helvetica Chimica Acta, 1996; 79: 1095-1109.

Jenner ("The Search for New Fragrance Ingredients." The Chemistry of Fragrances. 2nd Ed. Charles Sell (ed.). The Royal Society of Chemistry. 2006, 254-293).

Thomas-Danguin et al (29th Annual Meeting of the Association for Chemoreception Sciences, 2007).

* cited by examiner

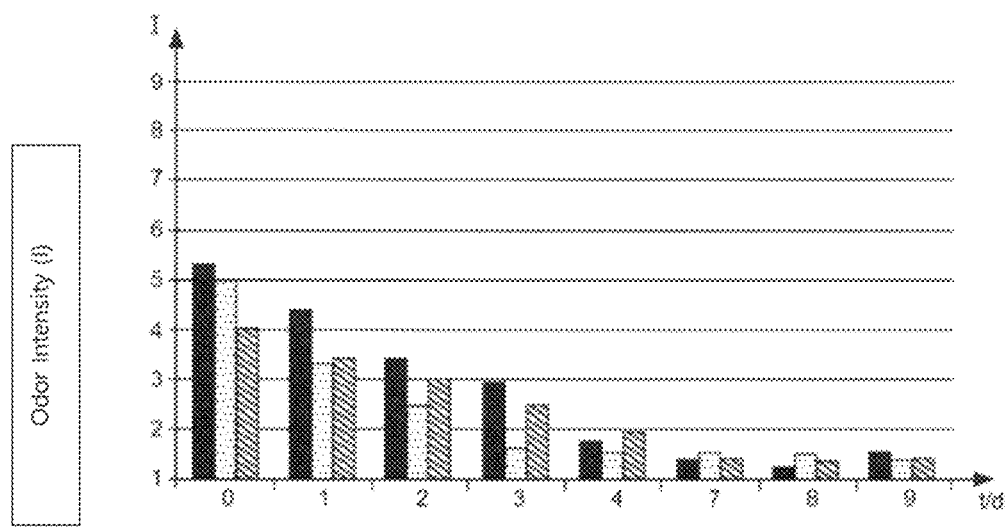
Elapsed time in days (t/d)
Ia = black filled; Ib = black dotted; Lilial® = black crosshatched

FRAGRANCES WITH NOTE OF LILY OF THE VALLEY

The present invention primarily relates to novel compounds selected from the group consisting of the compound of formula (Ia)

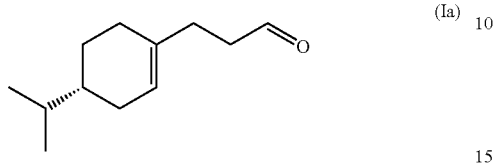
(Ia)

and of the compound of formula (Ib)

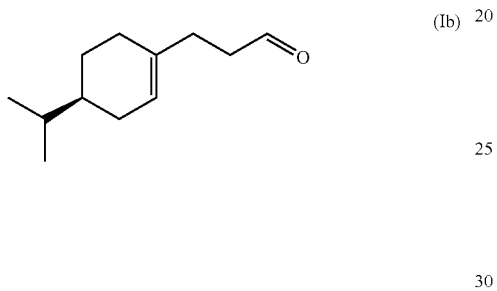
(Ib)

and mixtures comprising the compound of formula (Ia) as defined above and the compound of formula (Ib) as defined above or consisting of the compound of formula (Ia) and the compound of formula (Ib) as defined above. In addition, the invention relates to the use of a compound of formula (I)

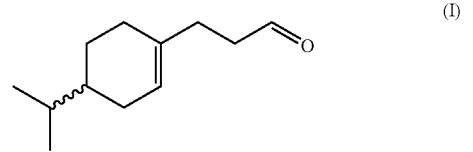
(I)

as fragrance, especially as lily-of-the-valley fragrance, and fragrance preparations and perfumed products comprising a (preferably sensorially effective) amount of the compound of formula (I) as defined above and methods of producing a compound of formula (I) as defined above.

Compounds with floral odor are an indispensable component in the perfume industry and in the production of cosmetics, body care products and washing and cleaning products. An especially valuable class of these floral fragrances are compounds with an odor note of lily of the valley.

Some representatives of this class of fragrances have a structure comprising a 4-alkyl-phenylpropanal as skeleton structure, for example 3-(4-tert-butylphenyl)-2-methylpropanal (formula (A); Lilial®, manufacturer: Givaudan S. A.), 3-(4-tert-butylphenyl)propanal (formula (B); Bourgeonal®, manufacturer: Quest), 3-(4-isopropylphenyl)-2-methylpropanal (formula (C), Cyclamal®, manufacturer: Givaudan S. A.) and 3-(3-isopropylphenyl)-butanal (formula (D), Florhydral®, manufacturer: Givaudan S. A.).

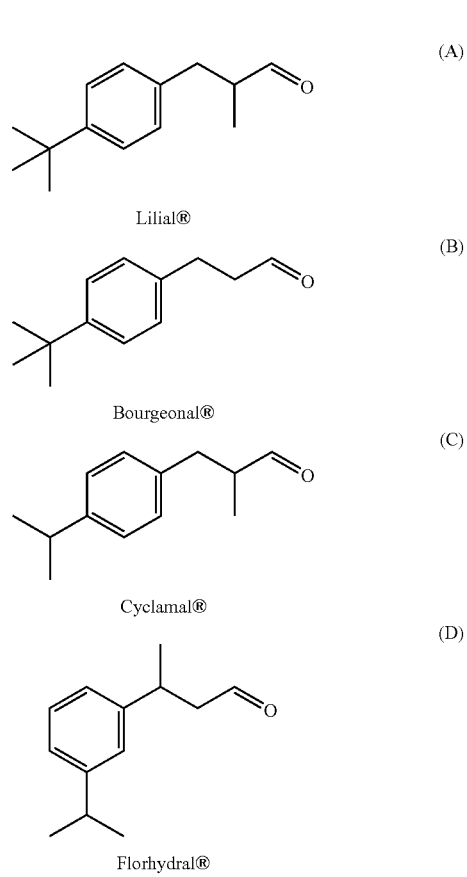

3-(4-tert-Butylphenyl)-2-methylpropanal (A), a synthetic fragrance, was for a long time one of the most important industrially used fragrances for floral fragrance compositions, especially with an odor note of lily of the valley, and was used in large quantities in the cosmetics and soaps industry. Then, however, results of animal tests showed that 3-(4-tert-butylphenyl)-2-methylpropanal could be reprotoxic. In addition, it was found that this compound is possibly an allergen and might cause contact dermatitis in sensitive persons. As the compounds 3-(4-tert-butylphenyl) propanal (B), 3-(4-isopropylphenyl)-2-methylpropanal (C) and 3-(3-isopropylphenyl)-2-methylpropanal (D) are very similar structurally to the compound 3-(4-tert-butylphenyl)-2-methylpropanal (A), it is entirely possible that these compounds are similarly toxic.

However, the occurrence of an odor with a note of lily of the valley is not linked to the skeleton structure described above.

Thus, patent document U.S. Pat. No. 6,376,458 discloses compounds represented by the following general formula (E), which in contrast to the compounds described above of formulas (A) to (D) have a saturated or unsaturated cyclohexyl group instead of a phenyl group:

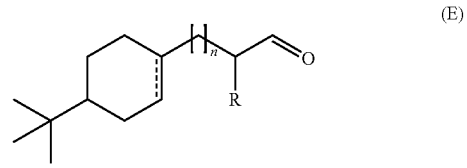
(E)

In formula (E), the endocyclic dashed line denotes a single bond or a double bond, and the group R is a methyl group or a hydrogen atom.

The compound 3-(4-tert-butyl-1-cyclohexen-1-yl)-2-methylpropanal specifically disclosed in patent document U.S. Pat. No. 6,376,458 has an odor comprising the odor notes lily of the valley, almost white flowers and freesias. The compound 3-(4-tert-butyl-1-cyclohexen-1-yl)propanal preferred according to U.S. Pat. No. 6,376,458 shows an odor of the aldehyde-like, floral lily of the valley-like, fatty type with a side note of Lilial®/Bourgeonal®, but this fragrance is more floral and the note of white flowers is more pronounced than with Lilial®.

The odor notes of the compounds of formula (F) disclosed in U.S. Pat. No. 7,834,219 have a strong floral note and a note of lily of the valley. The compounds differ from compounds (A) to (D) in that they comprise a cyclohexyl group instead of a phenyl group. In formula (F), the group R denotes an ethyl, isopropyl, or sec-butyl group.

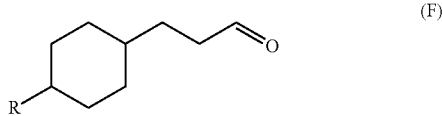
(F)

However, none of these compounds (B) to (F) known from the prior art is able to reproduce the odor impression of the natural lily of the valley blossom in its entire complexity.

Conversely, compounds are also known which, despite structural similarity to the compounds described above, do not have an odor note of lily of the valley, for example the compound pinoacetaldehyde of formula (G), described in patent document U.S. Pat. No. 3,716,498:

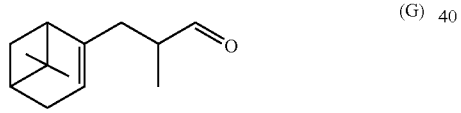
(G)

The odor of this molecule is described as persistent, very fresh, pungent, floral, woody and ozone-like.

The compound 3-(4-isopropyl-1-cyclohexen-1-yl)-2-methylpropanal (formula (H) also does not show any odor note of lily of the valley, despite structural similarity to compounds (A) to (F). Rather, the odor profile of this compound is aldehyde-like, sweet, watery and floral (cyclamen tendency).

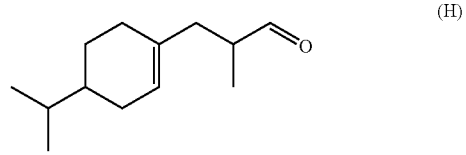
(H)

Despite the large number of fragrances already available, in the perfume industry there is still a general demand for new fragrances, which in addition to their primary, namely olfactory, properties, also possess positive secondary properties, for example greater stability in particular conditions of use, greater substantivity and/or diffusivity or better adherence, or which, through synergy effects with other fragrances, lead to better sensory profiles.

Fragrances that are characterized by the aforementioned positive secondary properties allow for increased efficiency in the production of fragrance preparations and perfumed products. For example, by using fragrances with a better sensory profile, higher substantivity and/or better adherence, the number and the amounts of fragrances used in corresponding formulations can be optimized and/or minimized, which leads to a saving of sustainable resources in the production of perfumed products.

Therefore there is in the perfume industry a demand in particular for further fragrances with improved sensory profiles and/or secondary properties.

The primary problem to be solved by the present invention was to provide a fragrance with a floral, especially lily-of-the-valley odor note, whose olfactory properties are comparable to 3-(4-tert-butylphenyl)-2-methylpropanal (Lilial®), i.e. the fragrance should impart an odor impression that largely corresponds to the complexity of the natural odor of lily of the valley blossom. Furthermore, this fragrance should preferably be superior with respect to the sum of its secondary properties or at least some of its secondary properties to the lily of the valley fragrances known from the prior art.

A fragrance is, in the context of the present text, any substance that is suitable for being used for bringing about an olfactory impression, i.e. for imparting an olfactory impression, or for altering (modifying or intensifying) the olfactory perception of another substance. Moreover, in order to be used for perfumery purposes, said substance should preferably have no undesirable side-effects, e.g. effects that are injurious to health or to the environment, or have no adverse effects on the proper use of a product that contains this fragrance.

The aforementioned problem is solved according to the invention by the use of a compound of formula (I)

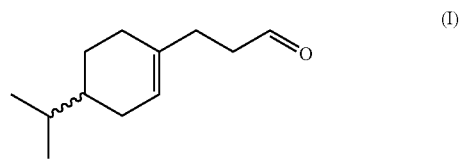
(I)

as fragrance, especially as lily-of-the-valley fragrance and/or as an agent for increasing the substantivity and/or the retention of a fragrance preparation;

and/or as fixative.

In the above formula (I) and all further formulas in this text, wavy lines denote a bond which (depending on the enantiomer in question) extends out of the plane of the drawing or behind the plane of the drawing.

Further aspects of the invention can be seen from the following description, the practical examples, the FIGURE and the appended patent claims.

The FIGURE shows:

FIG. 1 Assessment of the substantivity of the compound of formula (Ia) and of the compound of formula (Ib) compared to Lilial® (A) as a function of time It was found, surprisingly, that a compound of formula (I) imparts an odor impression that comes very close to the complexity of the natural odor of lily of the valley blossom. That is, the odor impression imparted by the compound of formula (I) is characterized by outstanding naturalness and complexity, especially with respect to the odor note of lily of the valley. Such a complex odor impression, largely corresponding to the natural odor of lily of the valley blossom, has not previously been achieved with the fragrances with an odor note of lily of the valley known from the prior art.

The search for suitable substances with an odor note of lily of the valley, which led to the present invention, was hampered by the following circumstances:

the mechanisms of odor perception are not adequately known;

the relationships between special odor perception on the one hand and the chemical structure of the associated fragrance on the other hand have not been investigated sufficiently;

even slight changes in the structural makeup of a known fragrance often bring about large changes in the sensory properties and impair compatibility for the human body.

The success of a search for suitable fragrances is therefore highly dependent on the intuition of the person conducting the search.

The fact that the odor profile of the compound of formula (I) to be used according to the invention is very similar to the odor profile of 3-(4-tert-butylphenyl)-2-methylpropanal was not to be expected, as the compound of formula (I) is structurally different in many respects from 3-(4-tert-butylphenyl)-2-methylpropanal (above formula (A)); the phenyl group in formula (A) is replaced in formula (I) with a cyclohexenyl group, the tert-butyl group in formula (A) is replaced with an isopropyl group, and the aldehyde side chain does not have a methyl group on the second carbon atom in formula (I), in contrast to formula (A).

The compound of formula (I) to be used according to the invention is characterized by high building-up capacity (Intrinsic adhesion on a substrate) and high substantivity (capacity for being absorbed from a, generally aqueous, phase onto a substrate or also to remain on a substrate after a washing or rinsing process). This effect is observed in particular on substrates such as the skin, the hair and textile fibers (e.g. wool, cotton, linen, synthetic fibers).

Another important technological requirement imposed on fragrances and fragrance preparations, especially for surfactant-containing products, is their substantivity with respect to the substrate or retention on the substrate, especially on the hair or on textile fibers. The terms "substantivity" and "retention" are for example explained in detail in EP 1 201 738 A1, cf. sections [0004]-[0005]. Fragrances are generally required to have high substantivity and/or retention.

In accordance with the foregoing, another aspect of the invention relates in particular to the use of the compound of formula (I) to be used according to the invention as an agent for increasing the substantivity and/or retention of a fragrance preparation (especially with respect to or on hair or textile fibers), preferably a fragrance preparation with an odor note of lily of the valley, preferably a fragrance preparation according to the invention as described below.

In addition to its high building-up capacity, the compound of formula (I) to be used according to the invention is characterized by its fixing properties, i.e. it is a fixative. As a fixative, the compound of formula (I) according to the invention increases the adherence of other fragrances, either by lowering their vapor pressure or by olfactory intensification (e.g. lowering of the threshold value). The invention therefore also relates—as mentioned above—to the use of the compound of formula (I) as a fixative.

The compound of formula (I) has indeed already been mentioned in the prior art, but its suitability as a fragrance, especially its particular suitability for imparting an odor note of lily of the valley, had not been recognized.

The publication *Comptes Rendus des Séances de l'Académie des Sciences, Série C: Sciences Chimiques* 1967, 264, 1083-1086 reports on investigations of the radical addition of ethanol or ethanal on β-pinene. The compound p-menthen-1-yl-7-ethanal is obtained as a minor constituent (less than 5%) of the crude product from radical addition of ethanal on β-pinene by means of benzoyl peroxide. A negative rotation value (−54.2°) is given for this compound.

The publication *Zhurnal Organicheskoi Khimii* 1974, 10, 1153-1157 reports on investigations of the radical addition of aliphatic aldehydes of the formula R—CH$_2$—CHO (R=H, methyl or ethyl) on β-pinene with Mn(III) acetate as initiator, optionally in the presence of catalytic amounts of copper(II) acetate. It was found that, depending on the reaction conditions (polarity of the solvent and amount of catalyst used), the reaction leads to an aldehyde of structure

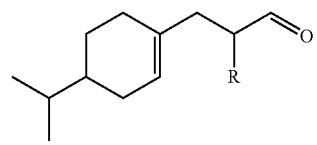

and a ketone of structure

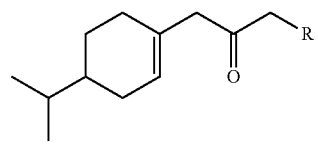

and/or to a dienaldehyde of the following structure

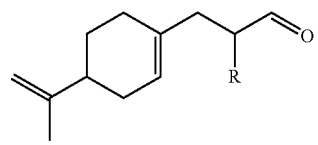

and an aldehyde ether of the following structure

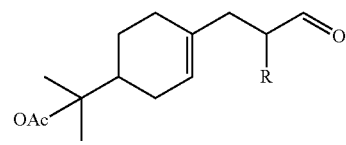

wherein R in each case is selected from the group consisting of hydrogen, methyl and ethyl.

The last two aforementioned compounds are assessed as novel and characterized in detail in the publication *Zhurnal Organicheskoi Khimii* 1974, 10, 1153-1157. Exclusively for these compounds, it is stated in the aforementioned publication that they may be interesting as perfumes. This applied in particular in the case of the dienaldehyde with R=ethyl, as this compound is a structural analog of cyclamen aldehyde.

In the publication *Bulletin de la Société Chimique de France* 1973, 4, 1368-1372, a compound with the formula R—$CH_2$—CHO, in which

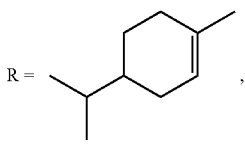

is mentioned as a product of the oxidation reaction of (p-menthen-1-yl-7)ethane-1,2-diol, which was itself produced from β-pinene and ethanol by a radical reaction. Detailed information on the physical and chemical properties of compound (I) is not disclosed.

The prior art described above does not contain any information on the olfactory properties of the compound of formula (I).

No distinction is made, in the aforementioned documents from the prior art, between the two enantiomers (compound of formula (Ia) as defined above and compound of formula (Ib) as defined above). Therefore it is not disclosed whether and in what proportions the compound disclosed in each case in the prior art contains the compound of formula (Ia) as defined above and/or the compound of formula (Ib) as defined above. The relative proportion of the two different enantiomers is determined by the enantiomeric composition of the respective educt β-pinene, since in the radical addition of an aldehyde on β-pinene, the stereochemistry remains unchanged. β-Pinene exists in two enantiomeric forms: (−)-β-pinene and (+)-β-pinene. In the aforementioned documents from the prior art it is only disclosed that β-pinene is used as educt. It is therefore not disclosed in what proportions the β-pinene used as educt contains the two enantiomers (−)-β-pinene or (+)-β-pinene.

Therefore the present invention also relates to a compound selected from the group consisting of the compound of formula (Ia)

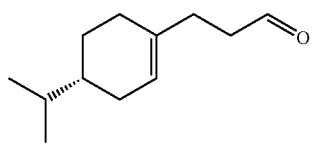

and the compound of formula (Ib)

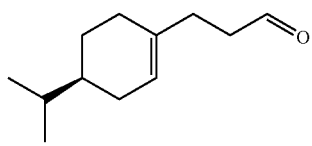

and a mixture comprising (i) the compound of formula (Ia) as defined above and (ii) the compound of formula (Ib) as defined above or consisting of the compound of formula (Ia) as defined above and the compound of formula (Ib) as defined above.

In the present text, compound of formula (Ia) or formula (Ib) means in each case the corresponding special enantiomer (as defined above), whereas the term "compound of formula (I)" comprises both the individual compounds selected from the group consisting of the compound of formula (Ia) and the compound of formula (Ib) and all mixtures (enantiomeric mixtures) consisting of these two compounds (in any mixture ratio). That is, statements relating to the "compound of formula (I)" always apply to the compound of formula (Ia) and the compound of formula (Ib) as well as to mixtures consisting of the compound of formula (Ia) and the compound of formula (Ib) in any mixture ratio.

In a mixture according to the invention consisting of the compound of formula (Ia) as defined above and the compound of formula (Ib) the mass ratio of the compound of formula (Ia) to the compound of formula (Ib) is preferably selected in such a way that the amount of rotation of the mixture is not −54.2°. Preferably, in said mixture the mass ratio of the compound of formula (Ia) to the compound of formula (Ib) is selected so as to give an amount of rotation greater than −54.2°, more preferably greater than −54°, even more preferably greater than −50°.

Mixtures that comprise the compounds of formula (Ia) as defined above and (ii) the compound of formula (Ib) as defined above or consist of these two compounds, are according to the invention mixtures preferably with
  a mass ratio of the compound of formula (Ia) to the compound of formula (Ib) in the range from 0.01 to 99.99, preferably in the range from 0.1 to 99.9, preferably in the range from 0.5 to 99.5, preferably in the range from 1.0 to 99.0, preferably in the range from 1.5 to 98.5, preferably in the range from 2.0 to 98.0
and/or
  a total proportion of compounds of formulas (Ia) and (Ib) greater than 0.01 wt %, preferably greater than 1 wt %, preferably greater than 10 wt %, more preferably greater than 50 wt %, especially preferably greater than 90 wt %, relative to the total weight of the mixture comprising compound (Ia) and/or (Ib)

The odor profile of the compound of formula (Ia) as defined above is described as follows: odor note of lily of the valley, floral, sweet, watery, powdery and ozone-like, natural, caring, complex and radiant. In particular the complex odor impression, largely corresponding to the natural odor of lily of the valley blossom, is noteworthy. With respect to olfactory properties, the compound of formula (Ia) is therefore similar to 3-(4-tert-butylphenyl)-2-methylpropanal (formula (A)).

The odor profile of the compound of formula (Ib) as defined above is described as follows: odor note of lily of the valley, fruity, green, watery and aldehyde-like.

The compound of formula (Ia) is, owing to its odor profile, especially suitable for imparting, modifying or intensifying an odor note of lily of the valley and optionally one, several or all odor notes selected from the group consisting of floral, sweet, watery, powdery and ozone-like and/or one, several or all impressions selected from the group consisting of natural, caring, complex and radiant.

Furthermore, it was found that the compound of formula (Ia), in conjunction with one or more further fragrances, is able to produce or to intensify further odor notes that are desirable for perfumery purposes, especially the odor notes creamy (cf. examples 10 and 14), cosmetic (see example 10), rounded aldehyde-like (see example 12), green (see example 13) and watery-fruity (see example 15).

The compound of formula (Ib) is, owing to its odor profile, especially suitable for imparting, modifying or intensifying an odor note of lily of the valley and optionally one, several or all odor notes selected from the group consisting of fruity, green, watery and aldehyde-like.

Therefore the compound of formula (Ia) as defined above according to the invention is preferably used for imparting, modifying or intensifying an odor note of lily of the valley and optionally one, several or all odor notes selected from the group consisting of floral, sweet, watery, powdery and ozone-like and/or one, several or all impressions selected from the group consisting of natural, caring, complex and radiant.

Alternatively or additionally the compound of formula (Ib) as defined above is preferably used according to the invention for imparting, modifying or intensifying an odor note of lily of the valley and optionally one, several or all odor notes selected from the group consisting of fruity, green, watery and aldehyde-like.

Another aspect of the present invention relates to fragrance preparations, especially perfume oils, wherein according to the invention, owing to the odor profiles described above of the compound of formula (Ia) and of the compound of formula (Ib), in particular fragrance preparations or perfume oils with an odor note of lily of the valley are of interest.

A fragrance preparation is, in the context of the present text, a mixture of various substances, which is produced by a prescribed method from the corresponding substances according to a recipe or a formulation. Said preparations are produced and used specifically for the purpose of imparting, modifying or intensifying a desired odor impression, usually perceived as pleasant or positive in some other way. Preparations such as are used in preparative organic chemistry, especially the preparations known from the prior art described above for radical addition on β-pinene, therefore are not fragrance preparations in the sense of the present invention. Respective mixtures described in the publications *Zhurnal Organicheskoi Khimii* 1974, 10, 1153-1157, *Comptes Rendus des Séances de l'Académie des Sciences*, Series C: Sciences Chimiques 1967, 264, 1083-1086 or *Bulletin de la Société Chimique de France* 1973, 4, 1368-1372, which comprise the compound of formula (I), are not an object of the present invention and in particular are not fragrance preparations according to the invention.

The following mixtures or combinations are therefore preferably also not fragrance preparations according to the invention:
  a mixture containing the compound of formula (I) as defined above, dimethylsulfoxide and optionally (p-menthen-1-yl-7)-2-ethanol tosylate as described in *Comptes Rendus des Séances de l'Academie des Sciences*, Series C: Sciences Chimiques 1967, 264, 1083-1086,
  a mixture containing the compound of formula (I) as defined above, the compound of formula (IV) described in *Comptes Rendus des Séances de l'Académie des Sciences*, Series C: Sciences Chimiques 1967, 264, 1083-1086 (as defined there) and optionally β-pinene and optionally ethanal and optionally di-tert-butyl peroxide,
  a mixture containing the compound of formula (I) as defined above, the compound of formula (4b) described in *Bulletin de la Société Chimique de France* 1973, 4, 1368-1372 (as defined there) and/or the compound of formula (Ib) described in *Bulletin de la Société Chimique de France* 1973, 4, 1368-1372 (as defined there) and optionally β-pinene and optionally ethanol and optionally di-tert-butyl peroxide and/or benzoyl peroxide,
  a mixture containing the compound of formula (I) as defined above and heptane, acetic acid, copper(II) acetate, manganese(III) acetate and/or manganese(II) acetate, the compound of formula (Ia) described in *Zhurnal Organicheskoi Khimii* 1974, 10, 1153-1157 (as defined there) and/or the compound of formula (IIa) described in *Zhurnal Organicheskoi Khimii* 1974, 10, 1153-1157 (as defined there) and/or the compound of formula (III) described in *Zhurnal Organicheskoi Khimii* 1974, 10, 1153-1157 (as defined there) and optionally β-pinene and optionally ethanal.

A fragrance preparation according to the invention is preferably not a mixture containing
  the compound of formula (I) as defined above and heptane, acetic acid, manganese(II) acetate and/or manganese(II) acetate, the compound of formula (Ia) described in *Zhurnal Organicheskoi Khimii* 1974, 10, 1153-1157 (as defined there) and/or the compound of formula (IIa) described in *Zhurnal Organicheskoi Khimii* 1974, 10, 1153-1157 (as defined there) and/or the compound of formula (IIIa) described in *Zhurnal Organicheskoi Khimii* 1974, 10, 1153-1157 (as defined there), and optionally β-pinene and optionally ethanal.
or
  the compound of formula (I) as defined above and heptane, acetic acid, copper(II) acetate, manganese(II) acetate and/or manganese(II) acetate, and optionally β-pinene and optionally ethanal.
or
  the compound of formula (I) as defined above, optionally β-pinene and optionally ethanal and optionally di-tert-butyl peroxide or
  the compound of formula (I) as defined above, the compound of formula (Ib) described in *Bulletin de la Société Chimique de France* 1973, 4, 1368-1372 (as defined there) and optionally β-pinene and optionally ethanol and optionally di-tert-butyl peroxide and/or benzoyl peroxide.

Even more preferably, a fragrance preparation according to the invention is not a mixture containing
  the compound of formula (I) as defined above and heptane, acetic acid, manganese(II) acetate and/or manganese(II) acetate and optionally β-pinene and optionally ethanal
or
  the compound of formula (I) as defined above, the compound of formula (Ib) described in *Bulletin de la Société Chimique de France* 1973, 4, 1368-1372 (as defined there) and optionally di-tert-butyl peroxide and/or benzoyl peroxide.

Quite especially preferably, the fragrance preparation according to the invention is not a mixture containing the compound of formula (I) as defined above and one or more substances selected from the group consisting of heptane, acetic acid, β-pinene, ethanal, manganese salts, copper salts, compound of formula (Ia) from the publication *Zhurnal Organicheskoi Khimii* 1974, 10, 1153-1157 (as defined there), compound of formula (IIa) from the publication *Zhurnal Organicheskoi Khimii* 1974, 10, 1153-1157 (as defined there), compound of formula (IIIa) from the publication *Zhurnal Organicheskoi Khimii* 1974, 10, 1153-1157 (as defined there), dimethylsulfoxide, (p-menthen-1-yl-7)-2-ethanol tosylate, di-tert-butyl peroxide, benzoyl peroxide, the compound (4b) described in *Bulletin de la Société*

*Chimique de France* 1973, 4, 1368-1372 (as defined there) and the compound (1b) described in *Bulletin de la Societe Chimique de France* 1973, 4, 1368-1372 (as defined there). Even more preferably, the fragrance preparation according to the invention is not a mixture containing the compound of formula (I) as defined above and one or more peroxides.

A fragrance preparation according to the invention, especially in the form of a perfume oil, preferably with an odor note of lily of the valley, consists of or comprises
   compound of formula (I) as defined above, and
   one, 2, 3, 4, 5, 6, 7, 8, 9, 10 or more further fragrances, which are not a compound of formula (I).

In particular, by combining the compounds of formula (I) as defined above, preferably in one of the embodiments stated as being preferable, with one or more further fragrances (preferably with one, several or all odor notes selected from the group consisting of floral, sweet, watery, ozone-like, woody, ambery, musky, fruity, animal), interesting new fragrance preparations can be produced. In this way, mixtures with particularly interesting, natural, new and original notes can be created. Fragrances that are, in the sense of the above definition, suitable as further fragrances for use in a fragrance preparation according to the invention, are given for example in S. Arctander, Perfume and Flavor Materials, Vol. I and II, Montclair, N. J. 1969, self-published, or K. Bauer et al., Common Fragrance and Flavor Materials, 4th Edition, Wiley-VCH, Weinheim 2001.

In detail, the following may be mentioned: extracts of natural raw materials such as essential oils, concretes, absolutes, resins, resinoids, balsams, tinctures, for example:
   amber tincture; *amyris* oil; *angelica* seed oil; *angelica* root oil; *anise* oil; *valerian* oil; basil oil; tree moss absolute; *bay* oil; mugwort oil; gum *benzoin*; bergamot oil; beeswax absolute; birch tar oil; bitter almond oil; savory oil; buchu leaf oil; *cabreuva* oil; cade oil; calmus oil; camphor oil; *cananga* oil; cardamom oil; *cascarilla* oil; *cassia* oil; cassie absolute; *castoreum* absolute; cedar leaf oil; cedar wood oil; *cistus* oil; *citronella* oil; lemon oil; *copaiba* balsam; *copaiba* balsam oil; coriander oil; *costus* root oil; cumin oil; cypress oil; *davana* oil; dill oil; dill seed oil; eau de brouts absolute; oak moss absolute; elemi oil; tarragon oil; *Eucalyptus citriodora* oil; *eucalyptus* oil; fennel oil; spruce-needle oil; *galbanum* oil; *galbanum* resin; *geranium* oil; grapefruit oil; guaiac wood oil; gurjun balsam; gurjun balsam oil; *helichrysum* absolute; *helichrysum* oil; ginger oil; *iris* root absolute; *iris* root oil; jasmine absolute; calmus oil; blue chamomile oil; Roman chamomile oil; carrot seed oil; *cascarilla* oil; pine needle oil; spearmint oil; caraway oil; labdanum oil; labdanum absolute; labdanum resin; lavandin absolute; lavandin oil; lavender absolute; lavender oil; lemongrass oil; lovage oil; distilled lime oil; pressed lime oil; linaloe oil; *Litsea cubeba* oil; *bay* leaf oil; mace oil; marjoram oil; *mandarin* oil; *massoy* bark oil; *mimosa* absolute; musk seed oil; musk tincture; clary oil; nutmeg oil; myrrh absolute; myrrh oil; myrtle oil; clove leaf oil; clove blossom oil; neroli oil; olibanum absolute; olibanum oil; *opopanax* oil; orange blossom absolute; orange oil; *origanum* oil; palmarosa oil; patchouli oil; *perilla* oil; *Peru* balsam oil; parsley leaf oil; parsley seed oil; petitgrain oil; peppermint oil; pepper oil; *pimento* oil; *pine* oil; poley oil; rose absolute; rosewood oil; rose oil; rosemary oil; Dalmatian sage oil; Spanish sage oil; sandalwood oil; celery seed oil; spike lavender oil; star *anise* oil; *styrax* oil; *tagetes* oil; fir-needle oil; tea tree oil; turpentine oil; thyme oil; tolu balsam; tonka absolute; *tuberose* absolute; vanilla extract; violet leaf absolute; *verbena* oil; vetiver oil; *juniper* berry oil; wine lees oil; wormwood oil; wintergreen oil; ylang-ylang oil; hyssop oil; civet absolute; cinnamon leaf oil; cinnamon bark oil and fractions thereof, or ingredients isolated therefrom;

individual fragrances from the hydrocarbons group, for example 3-carene; α-pinene; β-pinene; α-terpinene; γ-terpinene; p-cymene; bisabolene; camphene; caryophyllene; cedrene; farnesene; limonene; longifolene; myrcene; ocimene; valencene; (E,Z)-1,3,5-undecatriene; styrene; diphenylmethane;

of aliphatic alcohols, for example hexanol; octanol; 3-octanol; 2,6-dimethylheptanol; 2-methyl-2-heptanol; 2-methyl-2-octanol; (E)-2-hexenol; 1-octen-3-ol; mixture of 3,4,5,6,6-pentamethyl-3/4-hepten-2-ol and 3,5,6,6-tetramethyl-4-methyleneheptan-2-ol; (E,Z)-2,6-nonadienol; 3,7-dimethyl-7-methoxyoctan-2-ol; 9-decenol; 10-undecenol; 4-methyl-3-decen-5-ol;

of aliphatic aldehydes and acetals thereof, for example hexanal; heptanal; octanal; nonanal; decanal; undecanal; dodecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-9-undecenal; 2,6,10-trimethyl-5,9-undecadienal; heptanaldiethylacetal; 1,1-dimethoxy-2,2,5-trimethyl-4-hexene; citron ellyloxyacetaldehyde; 1-(1-methoxy-propoxy)-(E/Z)-3-hexene;

of aliphatic ketones and oximes thereof, for example 2-heptanone; 2-octanone; 3-octanone; 2-nonanone; 5-methyl-3-heptanone; 5-methyl-3-heptanone-oxime; 2,4,4,7-tetramethyl-6-octen-3-one; 6-methyl-5-hepten-2-one;

of aliphatic sulfur-containing compounds, for example 3-methylthiohexanol; 3-methylthiohexyl acetate; 3-mercaptohexanol; 3-mercaptohexyl acetate; 3-mercaptohexyl butyrate; 3-acetylthiohexyl acetate; 1-menthene-8-thiol;

of aliphatic nitriles, for example 2-nonenoic acid nitrile; 2-undecenoic acid nitrile; 2-tridecenoic acid nitrile; 3,12-tridecadienoic acid nitrile; 3,7-dimethyl-2,6-octadienoic acid nitrile; 3,7-dimethyl-6-octenoic acid nitrile;

of esters of aliphatic carboxylic acids, for example (E)- and (Z)-3-hexenyl formate; ethyl acetoacetate; isoamyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl-isobutyrate; hexyl crotonate; ethyl isovalerate; ethyl-2-methylpentanoate; ethyl hexanoate; allyl hexanoate; ethyl heptanoate; allyl heptanoate; ethyl octanoate; ethyl-(E,Z)-2,4-decadienoate; methyl-2-octinate; methyl-2-noninate; allyl-2-isoamyloxyacetate; methyl-3,7-dimethyl-2,6-octadienoate; 4-methyl-2-pentylcrotonate;

of acyclic terpene alcohols, for example geraniol; nerol; lavandulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol 2,6-dimethyl-2,5,7-octatrien-1-ol; and formates, acetates, propionates, isobutyrates, butyrates, isovalerates, pentanoates, hexanoates, crotonates, tiglinates and 3-methyl-2-butenoates thereof;

of acyclic terpene aldehydes and ketones, for example citronellal; 7-methoxy-3,7-dimethyloctanal; 2,6,10-trimethyl-9-undecenal; geranylacetone; and the dimethyl and diethyl acetals of geranial, neral, of cyclic terpene alcohols, for example menthol; isopulegol; alpha-terpineol; terpinenol-4; menthan-8-ol; menthan-1-ol; menthan-7-ol; borneol; isoborneol; linalool oxide; nopol; cedrol; ambrinol; vetiverol; guaiol; and formates, acetates, propionates, isobutyrates, butyrates, isovalerates, pentanoates, hexanoates, crotonates, tiglinates and 3-methyl-2-butenoates thereof;

of cyclic terpene aldehydes and ketones, for example menthone; isomenthone; 8-mercaptomenthan-3-one; carvone; camphor; fenchone; alpha-ionone; beta-ionone; alpha-n-methylionone; beta-n-methylionone; alpha-isomethylionone; beta-isomethylionone; alpha-irone; beta-damascenone; 1-(2,4,4-trimethyl-2-cyclohexen-1-yl)-2-buten-1-one; 1,3,4,6,7,8a-hexahydro-1,1,5,5-tetramethyl-2H-2,4a-methano-naphthalen-8 (5H)-one; 2-methyl-4-(2,6,6-trimethyl-1-cyclohexen-1-yl)-2-butenal; nootkatone; dihydronootkatone; 4,6,8-megastigmatrien-3-one; alpha-sinensal; beta-sinensal; acetylated cedar wood oil (methyl cedryl ketone);

of cyclic alcohols, for example 4-tert-butylcyclohexanol; 3,3,5-trimethylcyclohexanol; 3-isocamphylcyclohexanol; 2,6,9-trimethyl-Z2,Z5,E9-cyclododecatrien-1-ol; 2-isobutyl-4-methyltetrahydro-2H-pyran-4-ol;

of cycloaliphatic alcohols, for example alpha,3,3-trimethylcyclohexylmethanol; 1-(4-isopropylcyclohexyl)ethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;

of cyclic and cycloaliphatic ethers, for example cineol; cedryl methyl ether; cyclododecylmethyl ether; 1,1-dimethoxycyclododecane; (ethoxymethoxy)cyclo-dodecane; alpha-cedrene-epoxide; 3a,6,6,9a-tetramethyl-dodecahydronaphtho[2,1-b]furan; 3a-ethyl-6,6,9a-trimethyldodecahydronaphtho[2,1 b]furan; 1,5,9-trimethyl-13-oxabicyclo[10.1.0]trideca-4,8-diene; rose oxide; 2-(2,4-dimethyl-3-cyclohexen-1-yl)-5-methyl-5-(1-methylpropyl)-1,3-dioxane;

of cyclic and macrocyclic ketones, for example 4-tert-butylcyclohexanone; 2,2,5-trimethyl-5-pentylcyclopentanone; 2-heptylcyclopentanone; 2-pentyl-cyclopentanone; 2-hydroxy-3-methyl-2-cyclopenten-1-one; 3-methyl-cis-2-penten-1-yl-2-cyclopenten-1-one; 3-methyl-2-pentyl-2-cyclopenten-1-one; 3-methyl-4-cyclopentadecenone; 3-methyl-5-cyclopentadecenone; 3-methylcyclopentadecanone; 4-(1-ethoxyvinyl)-3,3,5,5-tetramethylcyclohexanone; 4-tert-pentylcyclohexanone; 5-cyclohexadecen-1-one; 6,7-dihydro-1,1,2,3,3-pentamethyl-4(5H)-indanone; 8-cyclohexadecen-1-one; 9-cycloheptadecen-1-one; cyclopentadecanone; cyclohexadecanone;

of cycloaliphatic aldehydes, for example 2-methyl-4-(2,2,6-trimethyl-cyclohexen-1-yl)-2-butenal; 4-(4-hydroxy-4-methylpentyl)-3-cyclohexenecarbaldehyde; 4-(4-methyl-3-penten-1-yl)-3-cyclohexenecarbaldehyde;

of cycloaliphatic ketones, for example 1-(3,3-dimethyl-cyclohexyl)-4-penten-1-one; 2,2-dimethyl-1-(2,4-dimethyl-3-cyclohexen-1-yl)-1-propanone; 1-(5,5-dimethyl-1-cyclohexen-1-yl)-4-penten-1-one; 2,3,8,8-tetramethyl-1,2,3,4,5,6,7,8-octahydro-2-naphthalenylmethyl ketone; methyl-2,6,10-trimethyl-2,5,9-cyclododecatrienyl ketone; tert-butyl-(2,4-dimethyl-3-cyclohexen-1-yl) ketone;

of esters of cyclic alcohols, for example 2-tert-butylcyclohexyl acetate; 4-tert-butylcyclohexyl acetate; 2-tert-pentylcyclohexyl acetate; 4-tert-pentyl-cyclohexyl acetate; 3,3,5-trimethylcyclohexyl acetate; decahydro-2-naphthyl acetate; 2-cyclopentylcyclopentyl crotonate; 3-pentyltetrahydro-2H-pyran-4-yl acetate; decahydro-2,5,5,8a-tetramethyl-2-naphthyl acetate; 4,7-methano-3a,4,5,6,7,7a-hexa-hydro-5, or 6-indenyl acetate; 4,7-methano-3a,4,5,6,7,7a-hexahydro-5, or 6-indenyl-propionate; 4,7-methano-3a,4,5,6,7,7a-hexahydro-5, or 6-indenylisobutyrate; 4,7-methanooctahydro-5, or 6-indenyl acetate;

of esters of cycloaliphatic alcohols, for example 1-cyclohexylethyl crotonate;

of esters of cycloaliphatic carboxylic acids, for example allyl-3-cyclohexyl propionate; allylcyclohexyloxyacetate; cis- and trans-methyldihydrojasmonate; cis- and trans-methyljasmonate; methyl-2-hexyl-3-oxocyclopentane carboxylate; ethyl-2-ethyl-6,6-dimethyl-2-cyclohexene-carboxylate; ethyl-2,3,6,6-tetramethyl-2-cyclohexene-carboxylate; ethyl-2-methyl-1,3-dioxolan-2-acetate;

of araliphatic alcohols, for example benzyl alcohol; 1-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenylethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

of esters of araliphatic alcohols and aliphatic carboxylic acids, for example benzyl acetate; benzyl propionate; benzyl isobutyrate; benzyl isovalerate; 2-phenylethyl acetate; 2-phenylethyl propionate; 2-phenylethyl isobutyrate; 2-phenylethyl isovalerate; 1-phenylethyl acetate; alpha-trichloromethylbenzyl acetate; alpha,alpha-dimethylphenylethyl acetate; alpha,alpha-dimethylphenylethyl butyrate; cinnamyl acetate; 2-phenoxyethyl isobutyrate; 4-methoxybenzyl acetate;

of araliphatic ethers, for example 2-phenylethyl methyl ether; 2-phenylethyl isoamyl ether; 2-phenylethyl-1-ethoxyethyl ether; phenyl acetaldehyde dimethylacetal; phenylacetaldehyde diethylacetal; hydratropa aldehyde dimethylacetal; phenylacetaldehyde glycerol acetal; 2,4,6-trimethyl-4-phenyl-1,3-dioxane; 4,4a,5,9b-tetrahydroindeno[1,2-d]-m-dioxin; 4,4a,5,9b-tetrahydro-2,4-dimethylindeno[1,2-d]-m-dioxin;

of aromatic and araliphatic aldehydes, for example benzaldehyde; phenylacetaldehyde; 3-phenylpropanal; hydratropa aldehyde; 4-methylbenzaldehyde; 4-methylphenylacetaldehyde; 3-(4-ethylphenyl)-2,2-dimethylpropanal; 2-methyl-3-(4-isopropylphenyl)propanal; 2-methyl-3-(4-isobutylphenyl)propanal; 3-(4-tert-butyl-phenyl)propanal; cinnamaldehyde; alpha-butyl cinnamaldehyde; alpha-hexyl cinnamaldehyde; 3-methyl-5-phenylpentanal; 4-methoxybenzaldehyde; 4-hydroxy-3-methoxybenzaldehyde; 4-hydroxy-3-ethoxybenzaldehyde; 3,4-methylene dioxybenzaldehyde; 3,4-dimethoxybenzaldehyde; 2-methyl-3-(4-methoxyphenyl)propanal; 2-methyl-3-(4-methylene dioxyphenyl)propanal;

of aromatic and aralphatic ketones, for example acetophenone; 4-methylacetophenone; 4-methoxyacetophenone; 4-tert-butyl-2,6-dimethylacetophenone; 4-phenyl-2-butanone; 4-(4-hydroxyphenyl)-2-butanone; 1-(2-naphthalenyl)ethanone; 2-benzofuranylethanone; (3-methyl-2-benzofuranyl)ethanone; benzophenone; 1,1,2,3,3,6-hexamethyl-5-indanylmethyl ketone; 6-tert-butyl-1,1-di-methyl-4-indanylmethyl ketone; 1-[2,3-dihydro-1,1,2,6-tetramethyl-3-(1-methylethyl)-1 H-5-indenyl]ethanone; 5',6',7',8'-tetrahydro-3', 5',5',6',8',8'-hexamethyl-2-acetonaphthone;

of aromatic and aralphatic carboxylic acids and esters thereof, for example benzoic acid; phenylacetic acid; methyl benzoate; ethyl benzoate; hexyl benzoate; benzyl benzoate; methylphenyl acetate; ethylphenyl acetate; geranylphenyl acetate; phenylethyl-phenyl acetate; methyl cinnamate; ethyl cinnamate; benzyl cinnamate; phenylethyl cinnamate; cinnamyl cinnamate; allylphenoxyacetate; methyl salicylate; hexyl salicylate; cyclohexyl salicylate; cis-3-hexenyl salicylate; benzyl salicylate; phenylethyl salicylate; methyl-2,4-dihydroxy-3,6-dimethyl benzoate; ethyl-3-phenylglycidate; ethyl-3-methyl-3-phenylglycidate;

of nitrogen-containing aromatic compounds, for example 2,4,6-trinitro-1,3-dimethyl-5-tert-butylbenzene; 3,5-dinitro-2,6-dimethyl-4-tert-butylacetophenone; cinnamic acid nitrile; 3-methyl-5-phenyl-2-pentenoic acid nitrile; 3-methyl-5-phenylpentanoic acid nitrile; methylanthranilate; methy-N-methylanthranilate; Schiff's bases of methylanthranilate with 7-hydroxy-3, 7-dimethyloctanal, 2-methyl-3-(4-tert-butyl-phenyl) propanal or 2,4-dimethyl-3-cyclohexenecarbaldehyde; 6-isopropylquinoline; 6-isobutylquinoline; 6-sec-butylquinoline; 2-(3-phenylpropyl)pyridine; indole; skatole; 2-methoxy-3-isopropylpyrazine; 2-isobutyl-3-methoxypyrazine;

of phenols, phenyl ethers and phenyl esters, for example estragole; anethole; eugenyl methyl ether; isoeugenol; isoeugenyl methyl ether; thymol; carvacrol; diphenyl ether; beta-naphthylmethyl ether; beta-naphthylethyl ether; beta-naphthylisobutyl ether; 1,4-dimethoxybenzene; eugenyl acetate; 2-methoxy-4-methylphenol; 2-ethoxy-5-(1-propenyl)phenol; p-cresylphenyl acetate;

of heterocyclic compounds, for example 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

of lactones, for example 1,4-octanolide; 3-methyl-1,4-octanolide; 1,4-nonanolide; 1,4-decanolide; 8-decen-1,4-olide; 1,4-undecanolide; 1,4-dodecanolide; 1,5-decanolide; 1,5-dodecanolide; 4-methyl-1,4-decanolide; 1,15-pentadecanolide; 1,16-hexadecanolide; 9-hexadecen-1,16-olide; 10-oxa-1,16-hexadecanolide; 11-oxa-1,16-hexadecanolide; 12-oxa-1,16-hexadecanolide; ethylene-1,12-dodecanedioate; ethylene-1,13-tridecandioate; 2,3-dihydrocoumarin; octahydrocoumarin.

In a fragrance preparation according to the invention, especially in the form of a perfume oil, the amount of the compound of formula (Ia) as defined above and/or of the compound of formula (Ib) as defined above is preferably in the range from 0.0001 to 40 wt %, preferably in the range from 0.001 to 25 wt %, in each case relative to the total weight of the fragrance preparation.

With respect to the preferred mass ratio of the compound of formula (Ia) to the compound of formula (Ib), the same applies as for mixtures according to the invention comprising or consisting of the compounds of formula (Ia) and formula (Ib) (see above).

In addition to the aforementioned fragrances, a fragrance preparation according to the invention optionally contains further constituents, which are not themselves fragrances in the sense of the above definition, for example solvents, solubilizers, emulsifiers, stabilizers, radical traps.

In a preferred embodiment, a fragrance preparation according to the invention, especially in the form of a perfume oil, comprises one, 2, 3 or more further fragrances with an odor note of lily of the valley and optionally one, several or all odor notes selected from the group consisting of floral, sweet, watery, ozone-like, woody, ambery, musky, fruity, animal. Corresponding fragrances are known by a person skilled in the art.

A fragrance preparation according to the invention is especially preferred in which
(i) the amount of the compound of formula (Ia) is sufficient to endow the fragrance preparation with an odor note of lily of the valley and optionally one, several or all odor notes selected from the group consisting of floral, sweet, watery, powdery and ozone-like,
and/or
(ii) one, several or all further fragrances of the fragrance preparation impart an odor note of lily of the valley and optionally one, several or all odor notes selected from the group consisting of floral, sweet, watery, powdery and ozone-like, wherein the amount of the compound of formula (Ia) is sufficient, in comparison with a comparative fragrance preparation of otherwise identical composition without the compound of formula (Ia), to modify and/or to intensify the odor note of lily of the valley and optionally one, several or all the odor notes floral, sweet, watery, powdery and ozone-like,
and/or
(iii) the amount of the compound of formula (Ia) is sufficient to endow the fragrance preparation with one, several or all impressions selected from the group consisting of natural, caring, complex and radiant
and/or
(iv) the amount of the compound of formula (Ia) is sufficient to modify and/or to intensify one, several or all impressions selected from the group consisting of natural, caring, complex and radiant in comparison with a comparative fragrance preparation of otherwise identical composition without the compound of formula (Ia)
and/or
(v) the amount of the compound of formula (Ib) is sufficient to endow the fragrance preparation with an odor note of lily of the valley and optionally one, several or all odor notes selected from the group consisting of fruity, green, watery and aldehyde-like,
and/or
(vi) one, several or all further fragrances of the fragrance preparation impart an odor note of lily of the valley and optionally one, several or all odor notes selected from the group consisting of fruity, green, watery and aldehyde-like and the amount of the compound of formula (Ib) is sufficient, in comparison with a comparative fragrance preparation of otherwise identical composition without the compound of formula (Ib), to modify and/or to intensify the odor note of lily of the valley and optionally one, several or all the odor notes selected from the group consisting of fruity, green, watery and aldehyde-like.

Fragrance preparations according to the invention are for example obtainable by a method comprising the step of mixing
compound of formula (I) as defined above
and
one, 2, 3, 4, 5, 6, 7, 8, 9, 10 or more further fragrances, which are not a compound of formula (I),
and optionally further constituents, which are not fragrances.

The compound of formula (I) to be used as fragrance according to the invention, mixtures according to the invention as defined above and fragrance preparations according to the invention as defined above are used in particular for producing perfumed products (perfumed articles).

Accordingly, another aspect of the present invention relates to a perfumed product. A perfumed product according to the invention comprises the compound of formula (I) as defined above, preferably in a sensorially effective amount.

The compound of formula (I) is preferably a constituent of a mixture or fragrance preparation according to the invention. Therefore, in a preferred embodiment, a perfumed product comprises a mixture or fragrance preparation according to the invention, and a carrier or a substrate, wherein the carrier or the substrate is in direct contact with said mixture or fragrance preparation. The substrate is for example a solid substrate or the carrier is for example a solid carrier.

Preferred perfumed products according to the invention are detergents and cleaning products, hygiene or care products, especially products from the area of body and hair care, cosmetics and household products.

With respect to preferred embodiments, the statements made above apply correspondingly.

In this context, a perfumed product according to the invention is especially preferred in which the amount of the compound of formula (Ia) as defined above and/or of the compound of formula (Ib) as defined above is in the range from 0.0001 to 5 wt %, preferably in the range from 0.001 to 2.5 wt %, in each case relative to the total weight of the product.

With respect to the preferred mass ratio of the compound of formula (Ia) to the compound of formula (Ib), the same applies as for mixtures according to the invention comprising or consisting of the compounds of formula (Ia) and formula (Ib).

Preferred perfumed products according to the invention are selected from the group consisting of:
perfume extracts, eaux de parfum, eaux de toilette, shaving lotions, eaux de Cologne, pre-shave products, splash-Colognes, perfumed tissue wipes, perfumes for acid, alkaline and neutral cleansing agents, detergents, washing tablets, disinfectants, and air fresheners, aerosol sprays, waxes and polishes, and body care products, bath oils, cosmetic emulsions, for example skin creams and lotions, sunscreen creams and lotions, after-sun creams and lotions, hand creams and lotions, foot creams and lotions, depilatory creams and lotions, after-shave creams and lotions, tanning creams and lotions, hair care products, for example hair sprays, hair gels, fixing hair lotions, hair rinses, hair dyes, hair shaping agents and hair straightening agents, hair lotions, hair creams and lotions, deodorants and antiperspirants, products for decorative cosmetics, e.g. eyelid shadow, nail varnishes, makeup, lipsticks, mascara, as well as candles, lamp oils, joss sticks, insecticides, repellents, propellants.

Fragrance preparations according to the invention containing the compound of formula (I) or a mixture according to the invention as defined above can generally be used (e.g. in concentrated form, in solutions or in the modified form described below) for the production of e.g. perfume extracts, eaux de parfum, eaux de toilette, shaving lotions, eaux de cologne, pre-shave products, splash-Colognes and perfumed tissue wipes and the perfuming of acidic, alkaline and neutral cleaning agents, for example floor cleaners, window cleaners, dishwasher agents, bath and sanitary cleaners, scouring products, solid and liquid lavatory cleaners, powder and foam carpet cleaners, liquid detergents, powdered detergents, laundry pretreatment agents such as bleach, soaking agents and stain removers, fabric softeners, washing soaps, washing tablets, disinfectants, surface disinfectants and air fresheners in the form of liquid or gel or applied on a solid carrier, aerosol sprays, waxes and polishes such as furniture polishes, floor waxes, shoe creams and body care products, for example solid and liquid soaps, shower gels, shampoos, shaving soap, shaving foams, bath oils, cosmetic emulsions of the oil-in-water, water-in-oil and water-in-oil-in-water type, for example skin creams and lotions, face creams and lotions, sunscreen creams and lotions, after-sun creams and lotions, hand creams and lotions, foot creams and lotions, depilatory creams and lotions, after-shave creams and lotions, tanning creams and lotions, hair care products, for example hair sprays, hair gels, fixing hair lotions, hair rinses, permanent and semi-permanent hair dyes, hair shaping agents such as cold waves and hair straightening agents, hair lotions, hair creams and lotions, deodorants and antiperspirants, for example underarm sprays, roll-ons, deodorant sticks, deodorant creams, products for decorative cosmetics, for example eyelid shadow, nail varnishes, makeup, lipsticks, mascara as well as candles, lamp oils, joss sticks, insecticides, repellents, propellants.

Preferred perfumed products according to the invention are products selected from the group consisting of washing and cleaning products, hygiene or care products, especially from the area of body and hair care, cosmetics and household products, fine fragrance (perfume), air care (especially candles), air fresheners.

The aforementioned fragrance preparations according to the invention or the fragrance preparations to be used according to the invention in the corresponding products can be used for perfuming in liquid form, undiluted or diluted with a solvent. Suitable solvents for this are e.g. ethanol, isopropanol, diethylene glycol monoethyl ether, glycerol, propylene glycol, 1,2-butylene glycol, dipropylene glycol, diethyl phthalate, triethyl citrate, isopropyl myristate etc. For the explicitly named solvents, it applies that in the context of the present text, in the case of the presence of their own olfactory properties, they are to be classified exclusively as the constituent "solvent" and not the "fragrances".

The compound of formula (I) contained in the perfumed products according to the invention, a mixture according to the invention as defined above or a fragrance preparation according to the invention as defined above can, in a preferred embodiment, be absorbed on a carrier, which ensures both a fine distribution of the fragrances in the product and controlled release during use. Said carriers can be porous inorganic materials such as light sulfate, silica gels, zeolites, gypsums, clays, clay granules, porous concrete etc. or organic materials such as wood and cellulose-based materials.

The compound of formula (I) contained in the perfumed products according to the invention, a mixture according to the invention as defined above or a fragrance preparation according to the invention as defined above can also be microencapsulated, spray-dried, as inclusion complexes or as extrusion products and can be added in this form to the product or article to be perfumed.

Optionally, the properties of the fragrance preparations modified in this way can be further optimized by so-called "coating" with suitable materials with a view to a more targeted release of fragrance, for which preferably wax-like plastics, e.g. polyvinyl alcohol, are used.

The microencapsulation of the fragrance preparations can be carried out for example by the so-called coacervation process using capsule materials, e.g. of polyurethane-like substances or soft gelatin. The spray-dried perfume oils can be produced for example by spray-drying an emulsion or dispersion containing the perfume oil, wherein modified starches, proteins, dextrin and vegetable gums can be used as carriers. Inclusion complexes can be produced for example by feeding dispersions of the fragrance preparation and cyclodextrins or urea derivatives into a suitable solvent, e.g. water. Extrusion products can be produced by melting the fragrance preparation with a suitable wax-like substance and by extrusion and subsequent solidification, optionally in a suitable solvent, e.g. isopropanol.

The fragrance preparations according to the invention can then, as already mentioned, be used in concentrated form, in solutions or in the modified form described above for the production of the corresponding perfumed articles according to the invention.

Ingredients with which the compound of formula (I) according to the invention, a mixture according to the invention as defined above or a fragrance preparation according to the invention as defined above can preferably be combined are for example: preservatives, abrasives, antiacne agents, agents against skin aging, antibacterial agents, anticellulitis agents, antidandruff agents, anti-inflammatory agents, agents for preventing irritation, agents that inhibit irritation, antimicrobial agents, antioxidants, astringents, agents inhibiting sweating, antiseptics, antistatic agents, binders, buffers, carriers, chelating agents, cell stimulants, cleaning agents, care agents, depilatory agents, surface active substances, deodorants, antiperspirants, plasticizers, emulsifiers, enzymes, essential oils, fibers, film-forming agents, fixatives, foam formers, foam stabilizers, antifoaming agents, foam boosters, fungicides, gelling agents, gel-forming agents, hair care agents, hair shaping agents, hair straightening agents, hydrating agents, moisturizers, humectants, bleaching agents, strengthening agents, stain removers, optical brighteners, impregnating agents, dirt repellents, agents that reduce friction, lubricants, moisturizing creams, ointments, opacifiers, plasticizers, covering agents, polish, gloss agents, polymers, powders, proteins, refatting agents, abrading agents, silicones, skin calming agents, skin cleansing agents, skin-care agents, skin healing agents, skin lightening agents, skin protecting agents, skin softeners, cooling agents, skin cooling agents, warming agents, skin warming agents, stabilizers, UV absorbents, UV filters, detergents, fabric softeners, suspending agents, skin tanning agents, thickeners, vitamins, oils, waxes, fats, phospholipids, saturated fatty acids, singly or multiply unsaturated fatty acids, α-hydroxy acids, polyhydroxy fatty acids, liquefiers, dyes, color protecting agents, pigments, anticorrosive agents, aromatic substances, flavoring materials, polyols, surfactants, electrolytes, organic solvents or silicone derivatives.

Mixtures such as are used in preparative organic chemistry, especially the preparations for radical addition on β-pinene known from the prior art described above, are not perfumed products in the sense of the present invention. The mixtures optionally described in the works *Zhurnal Organicheskoi Khimii* 1974, 10, 1153-1157, *Comptes Rendus des Séances de l'Académie des Sciences*, Series C: Sciences Chimiques 1967, 264, 1083-1086 or *Bulletin de la Société Chimique de France* 1973, 4, 1368-1372, which comprise the compound of formula (I), are not objects of the present invention and in particular are not perfumed products according to the invention.

The following mixtures or combinations are therefore preferably also not perfumed products according to the invention:

- a mixture containing the compound of formula (I) as defined above, dimethylsulfoxide and optionally (p-menthen-1-yl-7)-2-ethanol tosylate as described in *Comptes Rendus des Séances de l'Académie des Sciences*, Series C: Sciences Chimiques 1967, 264, 1083-1086,
- a mixture containing the compound of formula (I) as defined above, the compound of formula (IV) described in *Comptes Rendus des Séances de l'Académie des Sciences*, Series C: Sciences Chimiques 1967, 264, 1083-1086 (as defined there) and optionally β-pinene and optionally ethanal and optionally di-tert-butyl peroxide,
- a mixture containing the compound of formula (I) as defined above, the compound of formula (4b) described in *Bulletin de la Société Chimique de France* 1973, 4, 1368-1372 (as defined there) and/or the compound of formula (Ib) described in *Bulletin de la Société Chimique de France* 1973, 4, 1368-1372 (as defined there) and optionally β-pinene and optionally ethanol and optionally di-tert-butyl peroxide and/or benzoyl peroxide,
- a mixture containing the compound of formula (I) as defined above and heptane, acetic acid, copper(II) acetate, manganese(II) acetate and/or manganese(II) acetate, the compound of formula (Ia) described in *Zhurnal Organicheskoi Khimii* 1974, 10, 1153-1157 (as defined there) and/or the compound of formula (IIa) described in *Zhurnal Organicheskoi Khimii* 1974, 10, 1153-1157 (as defined there) and/or the compound of formula (IIIa) described in *Zhurnal Organicheskoi Khimii* 1974, 10, 1153-1157 (as defined there) and optionally β-pinene and optionally ethanal.

A perfumed product according to the invention is preferably not a mixture containing the compound of formula (I) as defined above and heptane, acetic acid, manganese(III) acetate and/or manganese(II) acetate, the compound of formula (Ia) described in *Zhurnal Organicheskoi Khimii* 1974, 10, 1153-1157 (as defined there) and/or the compound of formula (IIa) described in *Zhurnal Organicheskoi Khimii* 1974, 10, 1153-1157 (as defined there) and/or the compound of formula (IIIa) described in *Zhurnal Organicheskoi Khimii* 1974, 10, 1153-1157 (as defined there), and optionally β-pinene and optionally ethanal or the compound of formula (I) as defined above and heptane, acetic acid, copper(II) acetate, manganese(II) acetate and/or manganese(II) acetate, and optionally 3-pinene and optionally ethanal or the compound of formula (I) as defined above, optionally β-pinene and optionally ethanal and optionally di-tert-butyl peroxide or
the compound of formula (I) as defined above, the compound of formula (Ib) described in *Bulletin de la Société Chimique de France* 1973, 4, 1368-1372 (as defined there) and optionally β-pinene and optionally ethanol and optionally di-tert-butyl peroxide and/or benzoyl peroxide.

Even more preferably, a perfumed product according to the invention is not a mixture containing
the compound of formula (I) as defined above and heptane, acetic acid, manganese(II) acetate and/or manganese(II) acetate and optionally β-pinene and optionally ethanal or
the compound of formula (I) as defined above, the compound of formula (Ib) described in *Bulletin de la Société Chimique de France* 1973, 4, 1368-1372 (as defined there) and optionally di-tert-butyl peroxide and/or benzoyl peroxide.

Quite especially preferably, the perfumed product according to the invention is not a mixture containing the compound of formula (I) as defined above and one or more substances selected from the group consisting of heptane, acetic acid, β-pinene, ethanal, manganese salts, copper salts, compound of formula (Ia) from the publication *Zhurnal Organicheskoi Khimii* 1974, 10, 1153-1157 (as defined there), compound of formula (IIa) from the publication *Zhurnal Organicheskoi Khimii* 1974, 10, 1153-1157 (as defined there), compound of formula (IIIa) from the publication *Zhurnal Organicheskoi Khimii* 1974, 10, 1153-1157 (as defined there), dimethylsulfoxide, (p-menthen-1-yl-7)-2-ethanol tosylate, di-tert-butyl peroxide, benzoyl peroxide, the compound (4b) described in *Bulletin de la Société Chimique de France* 1973, 4, 1368-1372 (as defined there) and the compound (1b) described in *Bulletin de la Société Chimique de France* 1973, 4, 1368-1372 (as defined there).

A further aspect of the present invention relates to a method of imparting, intensifying and/or modifying odor notes, especially an odor note of lily of the valley. A method according to the invention of imparting, intensifying and/or modifying odor notes, especially an odor note of lily of the valley and optionally one, several or all odor notes selected from the group consisting of floral, sweet, watery, powdery and ozone-like comprising the following step:
mixing or bringing into contact
the compound of formula (I) as defined above, or
a mixture according to the invention as defined above, or
a fragrance preparation according to the invention as defined above
preferably in a sensorially effective amount with a product.

With respect to preferred embodiments, the above statements apply correspondingly.

The method according to the invention described above is also suitable in the context of the production of a perfumed product according to the invention, wherein as result of the step of mixing or bringing into contact
of the compound of formula (I) as defined above, or
of a mixture according to the invention as defined above, or
of a fragrance preparation according to the invention as defined above
preferably in a sensorially effective amount with a product, the perfumed product according to the invention is formed. "Product" is in this case to be understood as the totality of the ingredients of the perfumed product according to the invention with the exception of the compound of formula (I) that is used, the mixture used according to the invention or the fragrance preparation used according to the invention.

In the method according to the invention, the high substantivity of the compounds (Ia) and (Ib) according to the invention proves advantageous, since the higher the substantivity of a fragrance, the smaller is the amount of the fragrance required to be used for maintaining an odor for a specified time.

Another aspect of the present invention relates to a method of providing skin, hair, surfaces or textile fibers with an odor note, especially an odor note of lily of the valley. A method according to the invention of providing skin, hair, surfaces or textile fibers with an odor note, especially an odor note of lily of the valley comprises the following steps:
providing a fragrance preparation comprising
(a) compound of formula (I) as defined above and
(b) one or more further fragrances, which are not a compound of formula (I)
wherein, in the fragrance preparation, the amount of the compound of formula (I) is sufficient to impart, to modify and/or to intensify an odor note of lily of the valley;
applying the fragrance preparation on skin, hair and/or textile fibers.

The fragrance preparation can be a constituent of a perfumed product according to the invention, for example a body, hair or textile care product.

With respect to preferred embodiments, the above statements apply correspondingly.

The compound of formula (I) to be used as fragrance according to the invention is obtainable inter alia by radical addition of ethanal onto (+)-β-pinene. The compounds according to the invention selected from the group consisting of the compound of formula (Ia) and of the compound of formula (Ib) are obtainable inter alia by radical addition of ethanal on (+)-β-pinene or (−)-β-pinene.

Another problem to be solved by the present invention was to provide novel methods for the production of the compound of formula (I) to be used as fragrance according to the invention and the compounds according to the invention selected from the group consisting of the compound of formula (Ia).

A method according to the invention for producing the compound of formula (I) as defined above comprises the step
acid-catalyzed reaction of an acetal of formula (II) so that the compound of formula (I) is formed

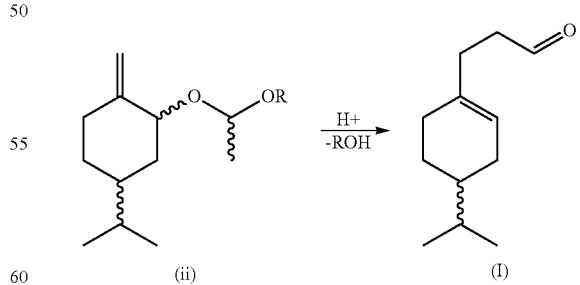

wherein the group R in the acetal of formula (II) is a linear or branched, saturated or unsaturated alkyl group with 1 to 10 carbon atoms, preferably a butyl group.

The acetal of formula (II) used in the method according to the invention (ii)

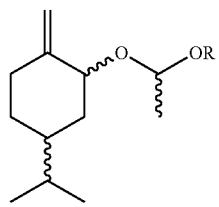

wherein the group R in the acetal of formula (II) is a linear or branched, saturated or unsaturated alkyl group with 1 to 10 carbon atoms, preferably a butyl group, is novel and is also an object of the present invention. The designation "acetal of formula (II)" comprises both the individual enantiomers (acetal of formula (IIa) as defined below and acetal of formula (IIb) as defined below) and all mixtures (enantiomeric mixtures) consisting of these two compounds (in any mixture ratio). That is, statements referring to the "acetal of formula (II)" always apply to the acetal of formula (IIa) and to the acetal of formula (IIb) as well as to mixtures consisting of the acetal of formula (IIa) and the acetal of formula (IIb) in any mixture ratio.

The acetal of formula (II) can be obtained in various ways (see below), wherein the educt is in each case preferably limonene. The stereochemistry of the educt used determines the stereochemistry of the compound of formula (I) obtained. If d-(+)-limonene is used as educt, the result is the compound of formula (Ia), and if l-(−)-limonene is used as educt, the result is the compound of formula (Ib). The present invention therefore also relates to the use of d-(+) limonene as educt for producing the compound of formula (Ia) as defined above, of l-(−) limonene as educt for producing the compound of formula (Ib) as defined above, or of a mixture containing d-(+) limonene and l-(−) limonene as educt for producing a mixture containing the compound of formula (Ia) as defined above and the compound of formula (Ib) as defined above.

The advantage of the use according to the invention of d-(+)-limonene and/or l-(−)-limonene as educt is that they are easily accessible, i.e. commercially available, low-cost educts from renewable raw materials. By the selective use of d-(+) or l-(−)-limonene, the compound of formula (Ia) or of formula (Ib) are in each case accessible selectively.

Two synthesis routes according to the invention, which in each case lead to the compound of formula (I) starting from limonene, are described below.

(i) Synthesis Route via Epoxidation of Hydrogenated d- or l-limonene The educt limonene (VI) (d-(+)-limonene and/or l-(−)-limonene) is first monohydrogenated catalytically in a manner known per se to p-menth-1-ene (formula (V)). This is epoxidized with a peracid in a manner known per se. The epoxide of formula (IV) obtained is heated in the presence of aluminum isopropylate, so that ring opening to the allyl alcohol of formula (III) takes place. By reaction of the allyl alcohol of formula (III) with an alkylvinyl ether, for example butylvinyl ether in the presence of a protic acid, for example phosphoric acid, the acetal of formula (II) is produced. Then the acetal of formula (II) is reacted with catalytic amounts of acid, for example hexanoic acid in a high-boiling solvent, for example Malotherm S via the intermediate 4-isopropyl-1-methylene-2-vinyloxy-cyclohexane to the compound of formula (I) to be used according to the invention (see below, reaction scheme (i)).

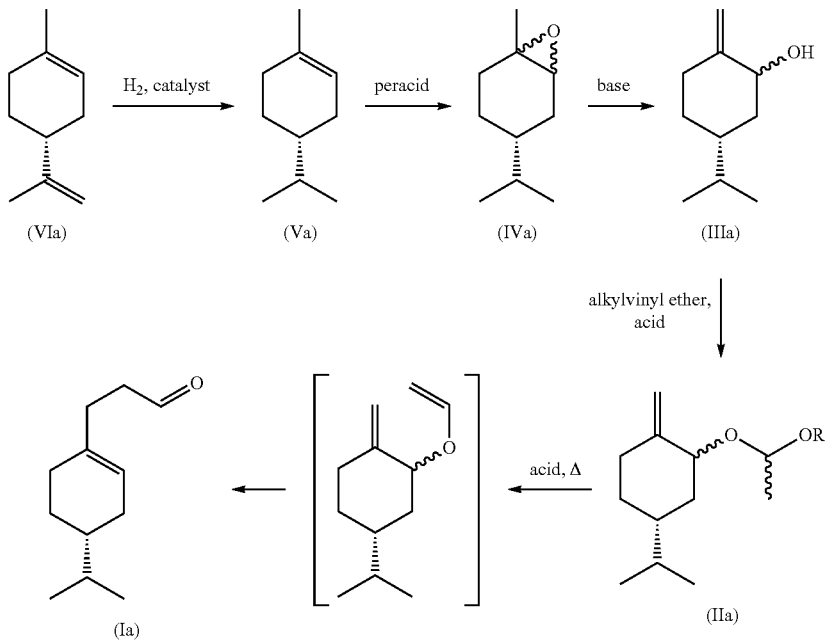

Reaction scheme (i)

Starting from d-(+)-limonene

Starting from l-(-)-limonene

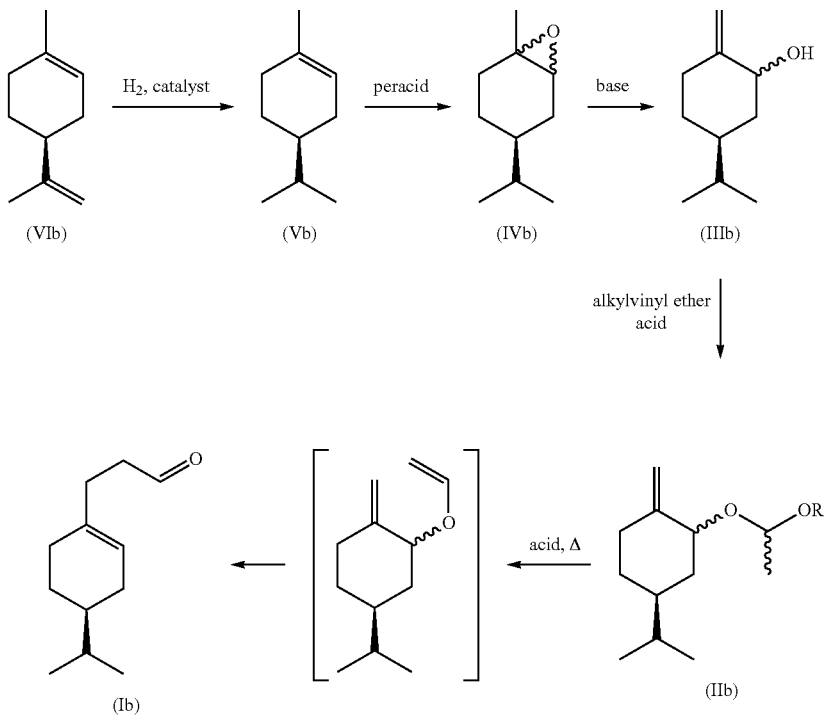

The first stage of synthesis route (i) according to the invention, the selective hydrogenation of the exocyclic double bond of limonene (formula (VIa), (VIb)), has often been described in the literature. Typical reagents for this reaction are platinum(IV) oxide, as published for example in the react *J. Chem. Soc., Chem. Commun.* 1994, 24, 2759-2760 or W-4 Raney nickel as published in *J. Org. Chem.* 1982, 10, 1824-1831. However, the use of ruthenium on carbon is easier to manage than the combustible Raney nickel and is less expensive than platinum(IV) oxide.

The epoxidation of p-menth-1-ene (formula (Va), (Vb)) is carried out with peracids such as perbenzoic acid, as undertaken for example in the work *Helv. Chim. Acta* 1984, 67, 1248-1253, but preferably with peracetic acid in dichloromethane, chloroform or benzene by the usual methods described in the literature, e.g. in *JACS* 1981, 103, 1813-1821. The solvent benzene is replaced with toluene, owing to its toxicity.

The next step is selective ring opening of the epoxide of formula (IVa), (VIb) to the allyl alcohol of formula (IIIa), (IIIb). Various products may form in this reaction, namely the desired allyl alcohol with the exocyclic double bond and the corresponding allyl alcohol with endocyclic double bond. In the literature, lithium diisopropylamide or tert-butanolate, among others, are described as base for this reaction [*Roczniki Chemii Ann. Soc. Chim. Polonorum* 1976, 50, 1709-1717 and *Helv. Chim. Acta* 1984, 67, 1249-1253]. Disadvantages in all these methods are that relatively high equivalent amounts of base have to be used, and the sometimes difficult manageability of bases such as lithium diisopropylamide and the low selectivity and/or yield. For example, using tert-butanolate in pyridine in the conditions stated in the above literature, there is formation of a mixture of product (65%), educt (28%) and an unknown byproduct (7%).

In connection with the present invention, a method was therefore to be provided in which the allyl alcohol of formula (IIIa), (IIIb) is obtainable at high selectivity and yield starting from the epoxide of formula (IVa), (Vb). It was found, unexpectedly, that this is possible if the reaction is carried out with catalytic amounts of aluminum isopropylate in xylene, similar to the production of pinocarveol in DE 31 432 27 and methylcyclododecatri-2,5,9-en-1-ol in U.S. Pat. No. 4,853,368. By heating the epoxidation product in the presence of a catalytic amount of aluminum isopropylate, selective opening of the epoxy ring is achieved by rearrangement.

The further reaction is then carried out in two steps, as explained for example in U.S. Pat. No. 3,716,498 for the production of pinoacetaldehyde. First, by reaction of the allyl alcohol of formula (IIIa), (IIIb) with an alkylvinyl ether, for example butylvinyl ether, in the presence of a protic acid, for example phosphoric acid, the acetal of formula (IIa), (IIb) is produced. Then the acetal of formula (IIa), (IIb) is reacted, with catalytic amounts of acid, for example hexanoic acid in a high-boiling solvent, for example Malotherm S, via the intermediate 4-isopropyl-1-methylene-2-vinyloxy-cyclohexane to the compound of formula (Ia), (Ib) to be used according to the invention.

Alternatively, the intermediate 4-isopropyl-1-methylene-2-vinyloxy-cyclohexane can, as is known by a person skilled in the art, be produced selectively from the allyl alcohol of formula (IIIa) or (IIIb) and acetylene.

A method preferred according to the invention for producing the compound of formula (Ia) as above and/or the compound of formula (Ib) as defined above accordingly comprises the following steps
providing d-(+) limonene (VIa) and/or l-(−) limonene (VIb)

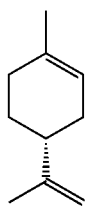

(VIa)

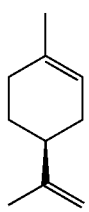

(VIb)

as educt hydrogenating of educt (VIa, VIb) provided, so that starting from d-(+) limonene (VIa) the compound of formula (Va) is formed,

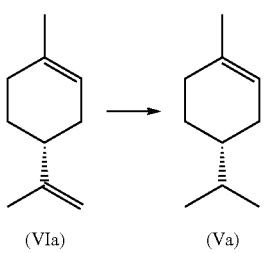

(VIa)      (Va)

l-(−) limonene (VIb) the compound of formula (Vb) is formed,

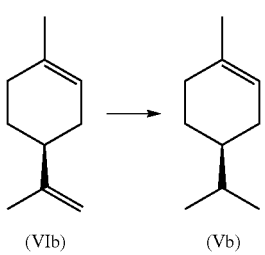

(VIb)      (Vb)

epoxidizing the compound (Va, Vb) formed by hydrogenation of the educt (VIa, VIb), so that starting from the compound of formula (Va), the epoxide of formula (IVa) is formed,

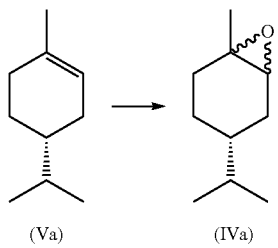

(Va)      (IVa)

the compound of formula (Vb), the epoxide of formula (IVb) is formed,

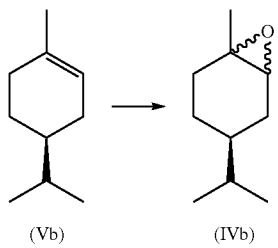

(Vb)      (IVb)

ring opening of the epoxide (IVa, IVb) formed by epoxidation of the compound (Va, Vb), so that starting from the epoxide of formula (IVa), the allyl alcohol of formula (IIIa) is formed,

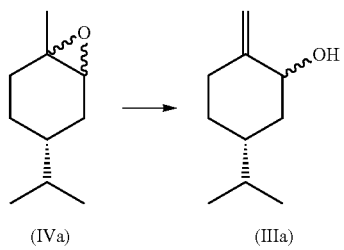

(IVa)      (IIIa)

the epoxide of formula (IVb), the allyl alcohol of formula (IIIb) is formed,

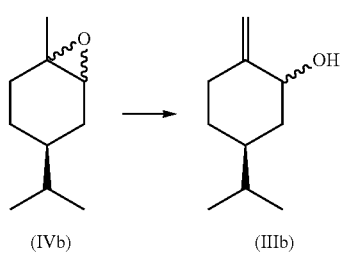

(IVb)      (IIIb)

addition of the allyl alcohol (IIIa, IIIb) formed in the ring opening of the epoxide (IVa, IVb) onto an alkylvinyl ether, preferably butylvinyl ether, so that starting from the allyl alcohol of formula (IIIa), the acetal of formula (IIa) is formed,

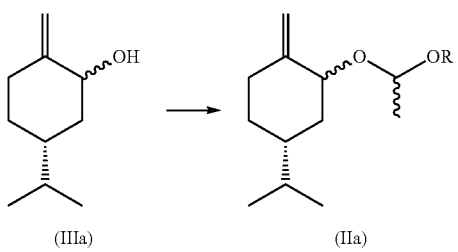

the allyl alcohol of formula (IIIb), the acetal of formula (IIb) is formed,

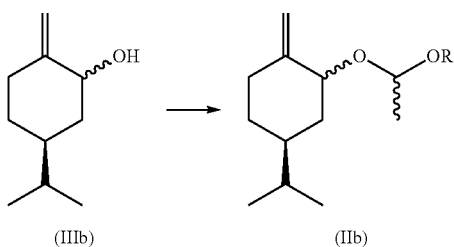

acid-catalyzed reaction of the acetal (IIa, IIb) formed in the addition of the allyl alcohol (IIIa, IIIb) onto an alkylvinyl ether, preferably butylvinyl ether so that starting from
the acetal of formula (IIa), the compound of formula (Ia) is formed,

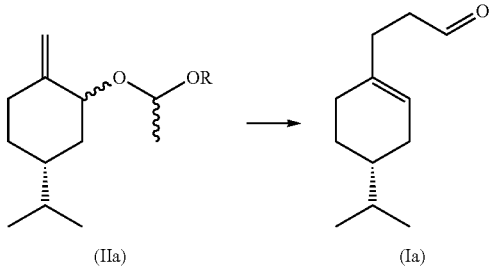

the acetal of formula (IIb), the compound of formula (Ib) formed is

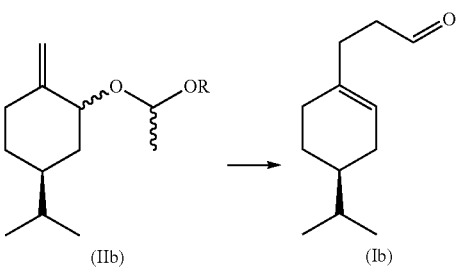

(ii) Synthesis Route via Photo-Oxidation of Hydrogenated d-(+)- or l-(−)-limonene For this synthesis route (see reaction scheme (ii) below), limonene (formula (VIa), (VIb)) is first hydrogenated as described above to p-menth-1-ene (formula (Va), (Vb)). P-Menth-1-ene (formula (Va), (Vb)) is then submitted in a solvent, e.g. methanol, in the presence of a sensitizer, e.g. Bengal pink at room temperature to photo-oxidation and the hydroperoxides that have formed (not shown in the following scheme)) are reduced with a suitable reducing agent, e.g. sodium sulfite to the corresponding isomeric allyl alcohols (formulas (IIIa), (IIIa'), (IIIa'), (IIIb), (IIIb'), (IIIb")). Then, as described above for synthesis route (i) by reaction of the allyl alcohol of formula (IIIa), (IIIb) with an alkylvinyl ether, for example butylvinyl ether in the presence of a protic acid, for example phosphoric acid, the acetal of formula (IIa), (IIb) is produced. Then the acetal of formula (IIa), (IIb) is reacted, with catalytic amounts of acid, for example hexanoic acid in a high-boiling solvent, for example Malotherm S via the intermediate 4-isopropyl-1-methylene-2-vinyloxy-cyclohexane to the compound of formula (Ia), (Ib) to be used according to the invention.

Reaction scheme (ii)

Starting from d-(+)-limonene

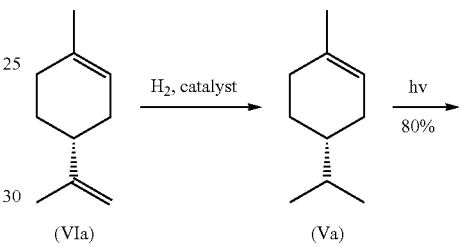

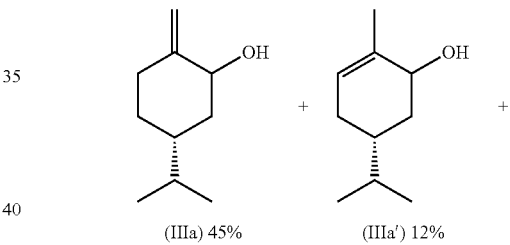

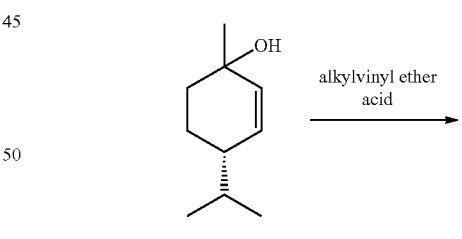

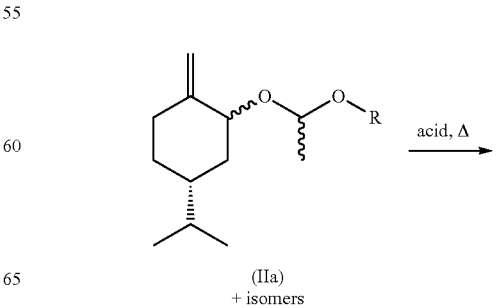

-continued

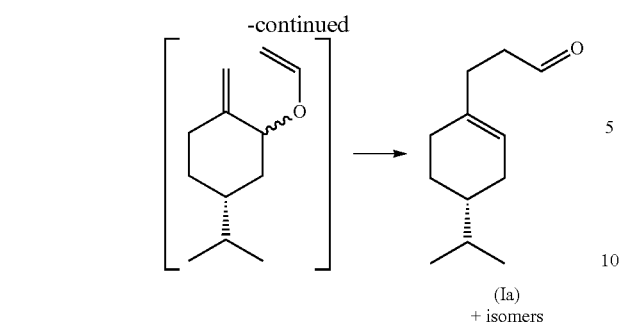

(Ia)
+ isomers

Starting from l-(-)-limonene

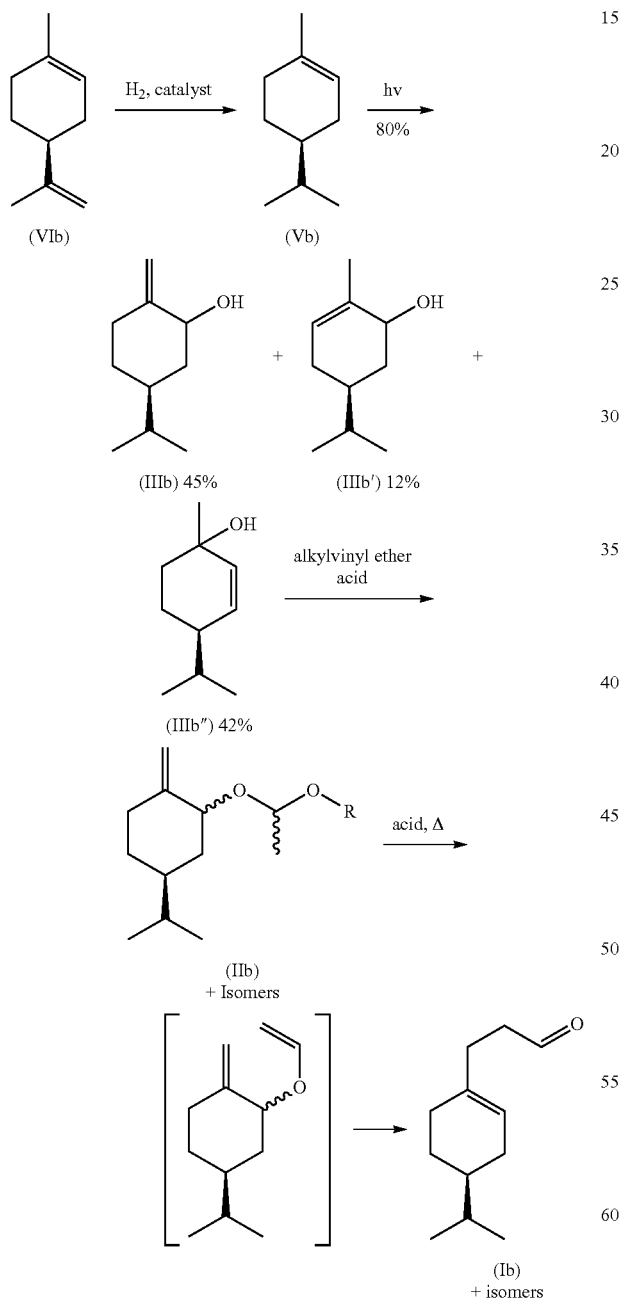

(Ib)
+ isomers

A method based on the above reaction scheme (ii) for producing the compound of formula (Ia) as defined above and/or the compound of formula (Ib) as defined above accordingly comprises the following steps:

providing d-(+) limonene (VIa) and/or l-(−) limonene (VIb)

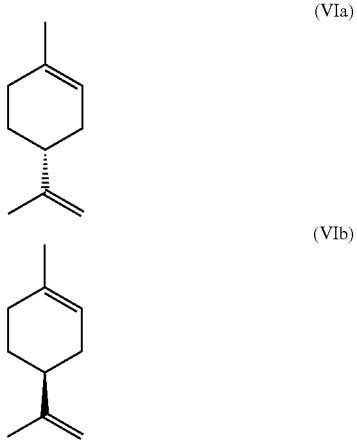

as educt hydrogenating the educt (VIa, VIb) provided, so that starting from d-(+) limonene (VIa), the compound of formula (Va) is formed,

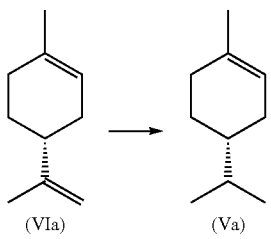

l-(−) limonene (VIb), the compound of formula (Vb) is formed,

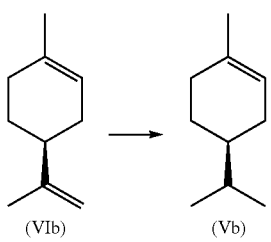

photo-oxidation of the compound (Va, Vb) formed by hydrogenation of the educt (VIa, VIb) and reduction of the resultant hydroperoxides, so that starting from the compound (Va), the allyl alcohol (IIIa) and its isomers (IIIa', IIIa") are formed

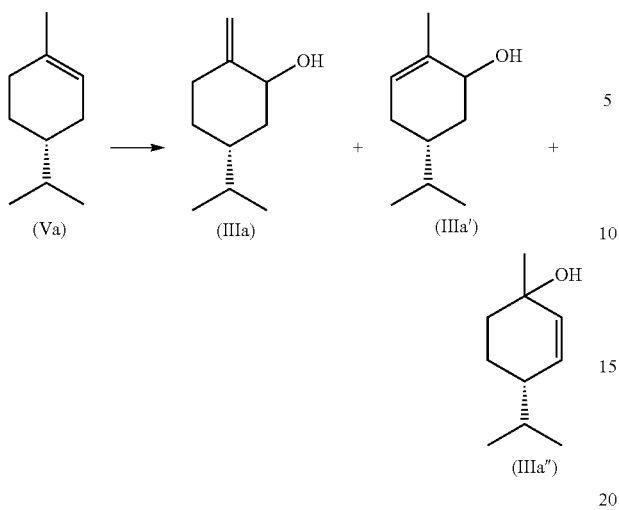

the compound (Vb), the allyl alcohol (IIIb) and its isomers (IIIb', IIIb") are formed

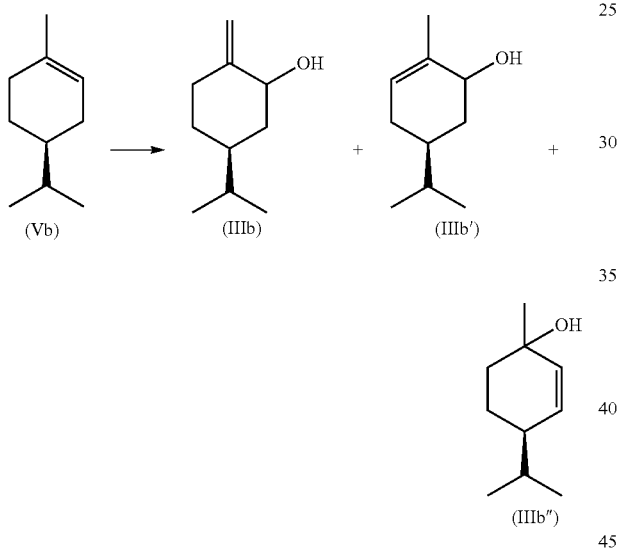

addition of the allyl alcohol (IIIa, IIIb) formed in the photo-oxidation of the compound (Va, Vb) onto an alkylvinyl ether, preferably butylvinyl ether, so that starting from the allyl alcohol of formula (IIIa), the acetal of formula (IIa) is formed,

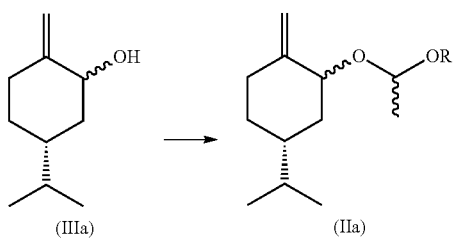

the allyl alcohol of formula (IIIb), the acetal of formula (IIb) is formed,

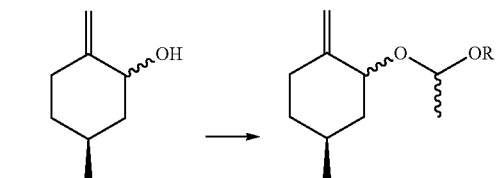

acid-catalyzed reaction of the acetal (IIa, IIb) formed in the addition of the allyl alcohol (IIIa, IIIb) onto an alkylvinyl ether, preferably butylvinyl ether, so that starting from the acetal of formula (IIa), the compound of formula (Ia) is formed,

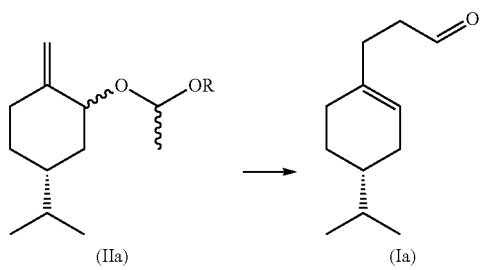

the acetal of formula (IIb), the compound of formula (Ib) is formed

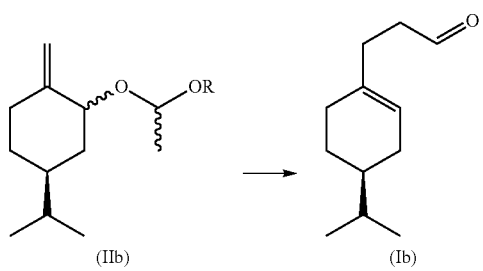

optionally separating the compound of formula (Ia) and/or of formula (Ib) from the isomers.

Owing to the need to separate the isomeric allyl alcohols of formulas (III') and (III") or their byproducts, formed in the photo-oxidation and subsequent reduction, this method is somewhat less preferred according to the invention.

An alternative method according to the invention for producing the compound of formula (I) as defined above comprises the step pyrolysis of the spirolactone of formula (VIII) (8-isopropyl-1-oxaspiro[4.5]decan-2-one) with formation of the compound of formula (I)

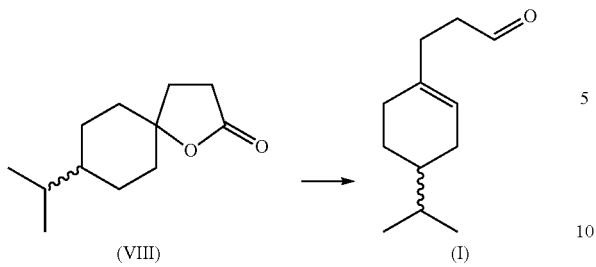

preferably in the presence of a cerium-containing catalyst, especially cerium(II) acetate hydrate.

8-Isopropyl-1-oxaspiro[4.5]decan-2-one is obtainable by a radical reaction of 4-isopropylcyclohexanol (formula (IX)) with methyl acrylate in the presence of di-tert-butyl peroxide. 4-Isopropylcyclohexanol (formula (IX)) is in its turn obtainable by hydrogenation of 4-isopropylphenol (formula (X)):

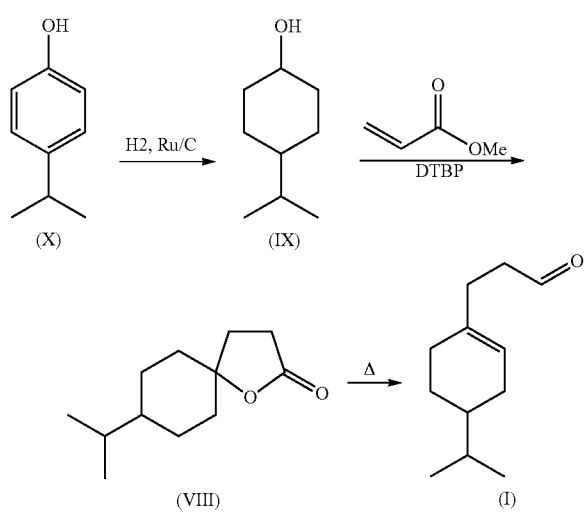

Production of 8-isopropyl-1-oxaspiro[4.5]decan-2-one is described in EP 0 105 157. This document does not, however, disclose the pyrolysis of said spirolactones; spirolactones are the target product of the method described in EP 0 105 157.

The document WO 2004/089861 describes the pyrolysis of a spirolactone of the general formula

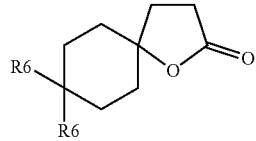

wherein the group R6 is a hydrogen atom or an alkyl group with 1 to 4 carbon atoms, in the presence of a reducing agent and a catalyst. However, WO 2004/089861 discloses neither the compound of formula (VIII) nor its pyrolysis product (1). A similar method is described in the work Helv. Chim. Acta 2004, 87, 1697-1703.

A preferred method according to the invention for production of the compound of formula (I) as defined above or the compound of formula (Ia) according to the invention as defined above and/or the compound of formula (Ib) according to the invention as defined above to be used as fragrance according to the invention comprises or consists of the following steps (a) providing 4-isopropyl-phenol (X) as educt

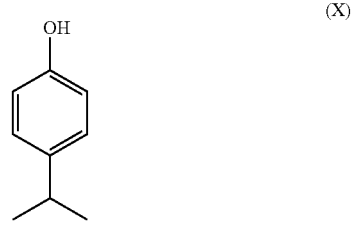

(b) hydrogenating the educt (X) provided to 4-isopropyl-hydroxycyclohexane (IX)

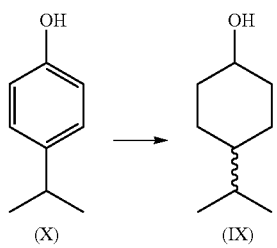

(c) reacting 4-isopropyl-hydroxycyclohexane (IX) with methyl acrylate with formation of the spirolactone of formula (VIII)

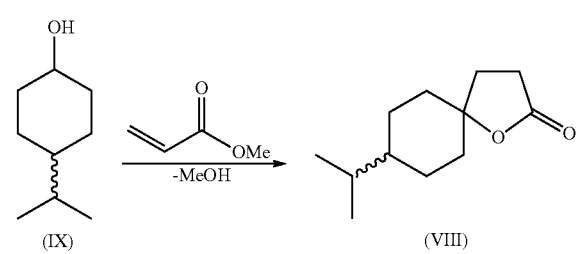

(d) pyrolysis of the spirolactone of formula (VIII) with formation of the compound of formula (I)

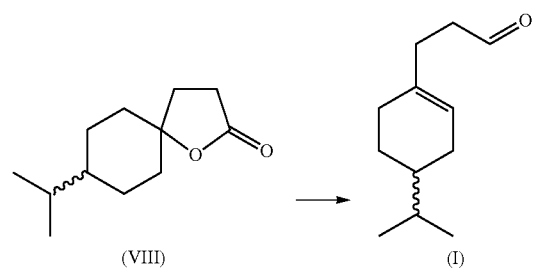

(e) optionally separating the enantiomer of formula (Ia) as defined above and/or the enantiomer of formula (Ib) as defined above.

In our own investigations it was found that the use of cerium(III) acetate hydrate coated on pumice as catalyst in the pyrolysis step (d) gives the best results. A raw yield of 28% was achieved, with a racemate as product.

A method of production of the compound of formula (Ia) according to the invention as defined above and/or of the compound of formula (Ib) according to the invention as defined above comprises the following steps or consists of the following steps steps (a) and (b) as described above after step (b), separating the cis and trans isomers (IXa, IXb)

(IXa)

(IXb)

separate reaction of the enantiomer of formula (IXa) and/or of the enantiomer of formula (IXb) corresponding to steps (c) and (d) of the method defined above to the compound of formula (Ia) or (Ib).

PRACTICAL EXAMPLES

Example 1: Synthesis of 4-isopropylcyclohexanol (IX)

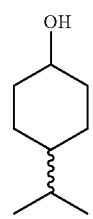

(IX)

An autoclave is charged with 1 kg of 4-isopropylphenol (formula (X) as defined above), 20 g of ruthenium on charcoal and 2.5 L of ethanol. The 4-isopropylphenol is hydrogenated for 6 hours at 140° C. and a hydrogen pressure of 40 bar. After filtration and removal of the solvent, 1.04 kg of crude product is obtained at a purity of 99.8% (cis/trans isomers in 1:1 ratio, quantitative yield).

Example 2: Synthesis of 8-isopropyl-4-oxaspiro[4.5]decan-3-one (VIII)

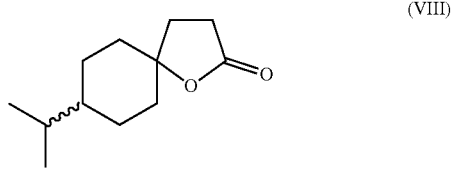

(VIII)

A mixture of 768 g of 4-isopropylcyclohexanol (5.40 mol, 4.50 equiv., formula (IX) as defined above) and 1.90 g of di-tert-butyl peroxide (13.0 mmol, 0.01 equiv.) is heated to 140° C. At this temperature, a mixture of 257 g of 4-isopropylcyclohexanol (1.80 mol, 1.50 equiv.) and 103 g of methyl acrylate (1.20 mol, 1.00 equiv.) is added dropwise in the space of 6 hours. The low-boiling products that form are removed. Then 6.5 g of di-tert-butyl peroxide (44.0 mmol, 0.04 equiv.) is added, and is further stirred for 2 hours at 160° C. After cooling, 150 g of 10% sodium sulfite solution is added to the reaction mixture and stirred for 1 hour at 60° C. The phases are separated, and the organic phase is washed with 100 g water. After removal of the solvent the crude product is purified by distillation. 102 g of (3R)-3-isopropyl-6-methyl-7-oxabicyclo[4.1.0]heptane is isolated at a purity of 90% (cis/trans isomers in the ratio 40:60). This corresponds to a yield of 43% of theory. The boiling point of the final product is 90° C. at 0.1 mbar.

trans-8-isopropyl-4-oxaspiro[4.5]decan-3-one: MS: m/z (%)=196 (Me$^{+\cdot}$, 5), 181 (6), 167 (3), 153 (10), 136 (24), 123 (23), 111 (100), 98 (30), 85 (27), 67 (16), 55 (29), 43 (31), 28 (10). $^1$H NMR (400 MHz, CDCl$_3$): (ppm)=0.87 (d, J=6.8 Hz, 6H), 1.02-1.14 (m, 1H), 1.36-1.52 (m, 5H), 1.57-1.64 (m, 2H), 1.89-1.94 (m, 2H), 1.97 (t, J=8.3 Hz, 2H), 2.58 (t, J=8.3 Hz, 2H). $^{13}$C NMR (100 MHz, CDCl$_3$): (ppm)=20.0 (2×CH$_3$), 26.3 (2×CH$_2$), 28.7 (CH$_2$), 30.4 (CH$_2$), 32.0 (CH), 36.4 (2×CH$_2$), 42.6 (CH), 87.3 (c$_{quart}$), 176.7 (c$_{quart}$).

cis-8-isopropyl-4-oxaspiro[4.5]decan-3-one: MS: m/z (%)=196 (M$^{+\cdot}$, 3), 181 (5), 167 (3), 153 (7), 136 (19), 123 (23), 111 (100), 98 (27), 85 (25), 67 (17), 55 (28), 43 (30), 28 (10). $^1$H NMR (400 MHz, CDCl$_3$): (ppm)=0.88 (d, J=6.8 Hz, 6H), 1.02-1.14 (m, 3 H), 1.36-1.52 (m, 1H), 1.68-1.82 (m, 6H), 2.06 (t, J=8.3 Hz, 2H), 2.58 (t, J=8.3 Hz, 2 H). $^{13}$C NMR (100 MHz, CDCl$_3$): (ppm)=19.8 (2×CH$_3$), 25.4 (2×CH$_2$), 28.7 (CH$_2$), 32.5 (CH), 34.2 (CH$_2$), 37.2 (2×CH$_2$), 43.0 (CH), 85.9 (c$_{quart}$), 177.0 (c$_{quart}$).

Example 3: Synthesis of 3-(4-isopropylcyclohexen-1-yl)propanal (1) by pyrolysis of 8-isopropyl-4-oxaspiro[4.5]decan-3-one (VIII)

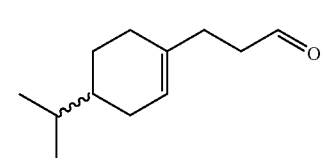

(I)

Preparation of the Catalyst:

450 g water is added to a mixture of 34 g cerium(Ill) acetate hydrate and 87 g pumice. The mixture is stirred for 1 hour at 50° C., and then the water is removed in the rotary evaporator. The pyrolysis tube is filled with 35 g of the prepared pumice (11 cm high) and heated for 1 hour at 440° C.

Pyrolysis:

A mixture of 2 g of 8-isopropyl-4-oxaspiro[4.5]decan-3-one (93%, 9.5 mmol, formula (VIII) as defined above) and 18 g of formic acid is fed into the equipment with the catalyst described above at 440° C. and in the space of 2 hours with a nitrogen flow of 16 L/h. The pyrolysis product is captured in a cold trap, then diluted with MTBE and neutralized with saturated sodium hydrogen carbonate solution. The phases are separated, and after removal of the solvent, 1.5 g of crude product is obtained at a purity of 32%. This corresponds to a raw yield of 28%.

Evaluation:

The NMR and MS data of the product obtained correspond to the data given in example 8.

Example 4: Synthesis of (+)-p-menth-1-ene (Va) Starting From d-(+)-limonene (VIa)

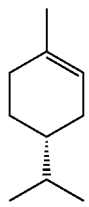

(Va)

A mixture of 1.5 kg d-(+)-limonene (98.7% ee, formula (VIa) as defined above), 3.0 L methanol and 4.5 g Raney nickel is hydrogenated in an autoclave at room temperature under a pressure of 50 bar. After the end of the reaction, the reaction mixture is filtered and then distilled. 1.3 kg of (+)-p-menth-1-ene (formula (Va) as defined above) is isolated at a purity of 91%. This corresponds to a yield of 78% of theory.

Boiling point: 102° C./110 mbar. –MS: m/z (%)=138 (M$^{+•}$, 32), 123 (13), 109 (5), 95 (100), 81 (23), 68 (50), 55 (19), 53 (9), 43 (7), 41 (20), 39 (10), 27 (10). $^1$H NMR (200 MHz, CDCl$_3$): (ppm)=0.87 (d, J=6.8 Hz, 3H), 0.89 (d, J=6.8 Hz, 3H), 1.15-1.26 (m, 2H), 1.41-1.50 (m, 1H), 1.62-1.65 (m, 3H), 1.72-1.78 (m, 2H), 1.87-2.04 (m, 3H), 5.35-5.40 (m, 1H). $^{13}$C NMR (50 MHz, CDCl$_3$): (ppm)=19.7 (CH$_3$), 20.0 (CH$_3$), 23.5 (CH$_3$), 26.6 (CH$_2$), 29.0 (CH$_2$), 30.9 (CH$_2$), 32.4 (CH), 40.1 (CH), 121.1 (CH), 133.8 (c$_{quart}$).

Example 5: Synthesis of (3R)-3-isopropyl-6-methyl-7-oxabicyclo[4.1.0]heptane (IVa)

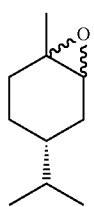

(IVa)

238 g of peracetic acid (40%, 1.25 mol, 1.25 equiv.) is added dropwise to a mixture of 152 g (+)-p-menth-1-ene (91%, 1.00 mol, 1.00 equiv., formula (Va) as defined above) and 53.0 g sodium carbonate (0.50 mol, 0.50 equiv.) in 500 mL toluene at 0° C. Then the reaction mixture is heated to room temperature and stirred for 3 hours. Water is added to the reaction mixture, the organic phase is separated and stirred with a 20% solution of sodium sulfite for 2 hours at 60° C. Then the phases are separated again and the organic phase is washed twice with water. After removal of the solvent, the crude product is purified by distillation. 133 g of (3R)-3-isopropyl-6-methyl-7-oxabicyclo[4.1.0]heptane (formula (IVa) as defined above) is isolated at a purity of 96% (cis/trans isomers in the ratio approx. 1:1). This corresponds to a yield of 83% of theory. The boiling point of the final product is 102° C. at 40 mbar.

(1R, 3R, 6S)-3-Isopropyl-6-methyl-7-oxabicyclo[4.1.0]heptane: MS: m/z (%)=154 (M$^{+•}$, 2), 139 (20), 125 (14), 111 (62), 95 (17), 83 (25), 69 (47), 55 (49), 43 (100), 27 (14).-$^1$H NMR (400 MHz, CDCl$_3$): δ (ppm)=0.83 (d, J=6.8 Hz, 6H), 0.92-1.07 (m, 1H), 1.11 (dd, J=12.4, 4.1 Hz, 1H), 1.30 (s, 3H), 1.31-1.47 (m, 3H), 1.62 (ddd, J=14.5, 12.2, 4.9 Hz, 1H), 1.95 (dddd, J=15.2, 6.0, 5.5, 2.0 Hz, 1H), 1.93 (ddd, J=14.6, 3.8, 2.4 Hz, 1 H), 2.97 (d, J=5.3 Hz, 1H).-$^{13}$C NMR (100 MHz, CDCl$_3$): δ (ppm)=19.4 (CH$_3$), 19.7 (CH$_3$), 22.5 (CH$_2$), 23.1 (CH$_3$), 27.9 (CH$_2$), 31.0 (CH$_2$), 32.3 (CH), 39.3 (CH), 57.8 (c$_{quart}$), 59.7 (CH).

(1S, 3R, 6R)-3-Isopropyl-6-methyl-7-oxabicyclo[4.1.0]heptane: MS: m/z (%)=154 (M$^{+•}$, 2), 139 (18), 125 (14), 111 (57), 93 (18), 83 (29), 69 (47), 55 (54), 43 (100), 27 (15).-$^1$H NMR (400 MHz, CDCl$_3$): δ (ppm)=0.84 (d, J=6.7 Hz, 3H), 0.85 (d, J=6.7 Hz, 3 H), 0.89-0.96 (m, 1H), 1.30 (s, 3H), 1.20-1.28 (m, 1H), 1.31-1.47 (m, 3H), 1.79-1.85 (m, 2H), 2.08 (ddd, J=14.6, 4.3, 2.0 Hz, 1H), 3.02 (t, J=2.1 Hz, 1H).-$^{13}$C NMR (100 MHz, CDCl$_3$): δ (ppm)=19.7 (2×CH$_3$), 24.5 (CH$_3$), 24.9 (CH$_2$), 29.2 (CH$_2$), 29.3 (CH$_3$), 31.7 (CH), 35.1 (CH), 37.6 (c$_{quart}$), 61.0 (CH).

Example 6: Synthesis of (5R)-5-isopropyl-2-methylene cyclohexanol (IIIa)

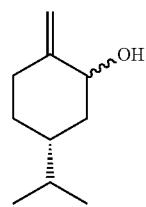

(IIIa)

49.0 g of aluminum isopropylate (0.24 mol, 0.10 equiv.) is carefully added dropwise to a mixture of 401 g of (3R)-3-isopropyl-6-methyl-7-oxabicyclo[4.1.0]heptane (96%, 2.48 mol, 1.00 equiv., formula (IVa) as defined above) in 1.4 L xylene. Then the reaction mixture is boiled under reflux for 4 hours. The reaction mixture is cooled to room temperature, 10% hydrochloric acid solution is added and the phases are separated. The aqueous phase is extracted with xylene and the combined organic phases are washed with water. The crude product is purified by distillation. 327 g of (5R)-5-isopropyl-2-methylene cyclohexanol (formula (IIIa) as defined above) is isolated at a purity of 71% (contains 62 g of (5R)-5-isopropyl-2-methylcyclohex-2-en- 1-ol). This corresponds to a yield of 60% of theory. The boiling point of the final product is 75° C. at 25 mbar.

(1R, 5R)-5-Isopropyl-2-methylene cyclohexanol: MS: m/z (%)=154 (M$^{+•}$, 14), 139 (7), 121 (13), 111 (51), 97 (18), 93 (48), 82 (60), 69 (63), 55 (100), 53 (20), 41 (83), 27 (27).-$^1$H NMR (400 MHz, CDCl$_3$): δ (ppm)=0.88 (2d, J=6.8 Hz, 6H), 0.96-1.07 (m, 2H), 1.33-1.42 (m, 1H), 1.46-1.54 (m, 1H), 1.71-1.78 (m, 1H), 1.93-2.03 (m, 1H), 2.11 (dddd, J=11.8, 5.2, 2.9, 2.2 Hz, 1H), 2.42 (ddd, J=13.5, 4.2, 2.6 Hz, 1H), 4.01-4.09 (m, 1H), 4.75 (q, J=1.8 Hz, 1H), 4.91 (dd, J=1.8, 1.5 Hz, 1H).-$^{13}$C NMR (100 MHz, CDCl$_3$): δ (ppm)=19.7 (CH$_3$), 19.9 (CH$_3$), 30.7 (CH$_2$), 32.3 (CH), 33.8 (CH$_2$), 40.5 (CH$_2$), 42.9 (CH), 72.5 (CH), 103.3 (CH$_2$), 152.0 (c$_{quart}$).

(1S, 5R)-5-Isopropyl-2-methylene cyclohexanol: MS: m/z (%)=154 (M$^{+•}$, 9), 136 (7), 125 (4), 121 (18), 111 (56), 97 (18), 93 (72), 83 (61), 77 (30), 67 (64), 55 (100), 53 (23), 41 (91), 27 (39).-$^1$H NMR (400 MHz, CDCl$_3$): δ (ppm)=0.87 (d, J=6.8 Hz, 3H), 0.88 (d, J=6.8 Hz, 3H), 1.09 (tdd, J=12.7, 11.5, 4.1 Hz, 1H), 1.34 (ddd, J=13.6, 12.1, 3.1 Hz, 1H), 1.42-1.51 (m, 1H), 1.64-1.74 (m, 1H), 1.75-1.81 (m, 1H), 1.90 (ddd, J=13.6, 3.5, 2.3 Hz, 1H), 2.18 (ddd, J=13.5, 4.0, 3.5 Hz, 1H), 2.36-2.45 (m, 1H), 4.33 (t, J=3.4 Hz, 1H), 4.74 (dd, J=2.0, 0.6 Hz, 1H), 4.82 (dd, J=2.1, 1.5 Hz, 1H).-$^{13}$C NMR (100 MHz, CDCl$_3$): δ (ppm)=19.7 (CH$_3$), 19.9 (CH$_3$), 30.0 (CH$_2$), 30.5 (CH$_2$), 31.9 (CH), 36.9 (CH), 37.5 (CH$_2$), 72.6 (CH), 109.2 (CH$_2$), 150.6 (c$_{quart}$).

Example 7: (4R)-2-(1-Butoxyethoxy)-4-isopropyl-1-methylene cyclohexane (IIa)

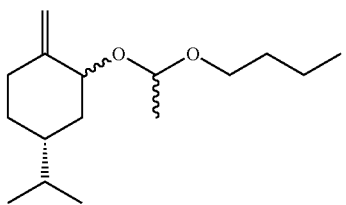

317 mg of p-toluene sulfonic acid monohydrate (1.70 mmol, 0.6 mol %) is added in portions to a mixture of 42.9 g of (5R)-5-isopropyl-2-methylene cyclohexanol (70%, 195 mmol, 1.00 equiv., formula (IIIa) as defined above)) and 55.7 g of butylvinyl ether (556 mmol, 2.90 equiv.) at 0° C. The reaction is exothermic and the heat released is removed by means of an ice bath at 17° C. Then it is stirred for 2 hours at 0 to 10° C. MTBE is added to the reaction mixture, and it is washed three times with 5% Na$_2$CO$_3$ solution and once with water. The organic phase is then separated and distilled over Na$_2$CO$_3$. 58.4 g of (4R)-2-(1-butoxyethoxy)-4-isopropyl-1-methylene cyclohexane is isolated at a purity of 71% (4 isomers in the proportions approx. 1:1:1.5:1.3). This corresponds to a yield of 83% of theory.

MS: m/z (%)=137 (23), 101 (78), 81 (32), 67 (8), 57 (52), 45 (100), 41 (24), 29 (13).

Example 8: Synthesis of 3-[(4R)-4-isopropylcyclo-hexen-1-yl]propanal (Ia)

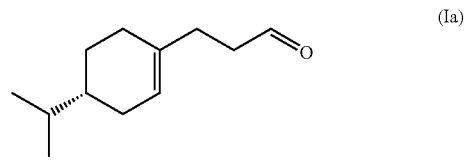

A mixture of 24 g of (4R)-2-(1-butoxyethoxy)-4-isopropyl-1-methylene cyclohexane (77%, 72 mmol, 1.00 equiv., formula (IIa) as defined above) and 2.5 g hexanoic acid (21 mmol, 0.30 equiv.) in 25 g Malotherm S is heated at 200° C. for 2 hours. During this, the low-boiling products are distilled off. Then the reaction mixture is cooled at room temperature and distilled over soda. 14.7 g of 3-[(4R)-4-isopropylcyclohexen-1-yl]-propanal (formula (Ia) as defined above) is isolated at a purity of 52% and with 96.6% ee. This corresponds to a yield of 58% of theory. Some of the product is purified on a column (cyclohexane: ethyl acetate 100:3, 3.34 g, purity 96.5%).

[α]$_D^{22}$=+108° (c=0.07 in ethanol). –GC with chiral stationary phase (Hydrodex-b-TBADc, 25 m×0.25 mm, 40° C.-1° C./min.-180° C.): R$_t$=79.08 (98.3%), 79.30 (1.7%). –MS: m/z (%)=180 (M$^{+•}$, 10), 162 (7), 147 (7), 136 (34), 119 (24), 109 (18), 93 (100), 79 (41), 67 (56), 55 (34), 41 (69), 27 (33).-$^1$H NMR (400 MHz, CDCl$_3$): δ (ppm)=0.87 (d, J=6.8 Hz, 3H), 0.88 (d, J=0.88 Hz, 3H), 1.16-1.28 (m, 2H), 1.42-1.50 (m, 1H), 1.66-1.80 (m, 2H), 1.94-2.06 (m, 3H), 2.28 (t, J=7.5 Hz, 2H), 2.49-2.54 (m, 2H), 5.39-5.43 (m, 1H), 9.75 (t, J=1.9 Hz, 1H). –$^{13}$C NMR (100 MHz, CDCl$_3$): δ (ppm)=19.6 (CH$_3$), 19.9 (CH$_3$), 26.3 (CH$_2$) 28.8 (CH$_2$) 29.2 (CH$_2$) 29.7 (CH$_2$) 32.2 (CH), 40.0 (CH), 41.9 (CH$_2$) 121.8 (CH), 135.5 (c$_{quart}$), 202.8 (CHO).

Example 9: Fine Fragrance (Perfume Oil)

| Fragrances | Parts by weight | |
|---|---|---|
| | Perfume oil A1 (comparison) | Perfume oil A2 (according to the invention) |
| ETHYL ACETOACETATE | 4.0 | 4.0 |
| HEXENOL CIS-3 10% DPG | 3.0 | 3.0 |
| HEXENYL ACETATE CIS-3 10% DPG | 3.0 | 3.0 |
| HEXENYL BENZOATE CIS-3 10% DPG | 3.0 | 3.0 |
| VERTOCITRAL 10% DPG | 5.0 | 5.0 |
| CYCLOGALBANAT® 10% DPG | 3.0 | 3.0 |
| STYRALYL ACETATE 10% DPG | 6.0 | 6.0 |
| BERGAMOT OIL BERGAPTEN FREE FF | 6.0 | 6.0 |
| MANDARY OIL DIST. DECOL. | 15.0 | 15.0 |
| METHYL ANTHRANILATE 10% DPG | 5.0 | 5.0 |
| RED BERRY EXTR. | 2.0 | 2.0 |
| DECALACTONE GAMMA | 2.0 | 2.0 |
| ALLYL CAPROATE 10% DPG | 5.0 | 5.0 |
| PRUNELLA TYPE BASE | 6.0 | 6.0 |
| HELIONAL | 20.0 | 20.0 |
| MUGETANOL | 10.0 | 10.0 |
| ETHYL LINALOOL | 35.0 | 35.0 |
| CITRONELLOL 950 | 10.0 | 10.0 |
| GERANIOL SUPER | 3.0 | 3.0 |

-continued

| Fragrances | Parts by weight | |
|---|---|---|
| | Perfume oil A1 (comparison) | Perfume oil A2 (according to the invention) |
| ROSAPHEN ® | 8.0 | 8.0 |
| CITRONELLYL ACETATE EXTRA | 2.0 | 2.0 |
| DAMASCONE BETA 10% DPG | 6.0 | 6.0 |
| BENZYL ACETATE | 10.0 | 10.0 |
| HEDION HC/30 | 30.0 | 30.0 |
| HEDIONE | 140.0 | 140.0 |
| HEXYL CINNAMIC ALDEHYDE ALPHA | 30.0 | 30.0 |
| LACTOJASMONE | 3.0 | 3.0 |
| BENZYL SALICYLATE | 80.0 | 80.0 |
| HEXENYL SALICYLATE CIS-3 | 30.0 | 30.0 |
| METHYL IONONE GAMMA COEUR | 3.0 | 3.0 |
| CLOVE BUD OIL | 1.0 | 1.0 |
| VANILLIN | 1.5 | 1.5 |
| COUMARIN | 1.0 | 1.0 |
| AMBERWOOD® F | 5.0 | 5.0 |
| CASHMERAN | 8.0 | 8.0 |
| CEDRENE | 15.0 | 15.0 |
| ISO E SUPER NON DISCOLORING | 50.0 | 50.0 |
| BRAHMANOL® | 25.0 | 25.0 |
| SANDALORE | 5.0 | 5.0 |
| AMBROXIDE | 2.0 | 2.0 |
| AMBRETTOLIDE | 5.0 | 5.0 |
| AURELIONE® | 16.0 | 16.0 |
| GLOBALIDE® | 24.0 | 24.0 |
| MACROLIDE® SUPRA | 16.0 | 16.0 |
| INDOLE FF 10% DPG | 5.0 | 5.0 |
| 3-[(4R)-4-Isopropylcyclohexen-1-yl]propanal | | 50.0 |
| DIPROPYLENE GLYCOL | 332.5 | 282.5 |
| | 1000.0 | 1000.0 |

At a dosage of 6 wt % of perfume oil A1 or A2 in ethanol, the findings are as follows: By adding 3-[(4R)-4-isopropylcyclohexen-1-yl]propanal in perfume oil A2 the floral note is intensified relative to perfume oil A1 (without 3-[(4R)-4-isopropylcyclohexen-1-yl]propanal). Furthermore, 3-[(4R)-4-isopropylcyclohexen-1-yl]propanal endows the composition with perfume oil A2 more power and fullness than the composition with perfume oil A1; on the whole, addition of 3-[(4R)-4-isopropylcyclohexen-1-yl]propanal results in an odor impression reminiscent of lily of the valley.

Example 10: Body Lotion

| Component | wt % | wt % |
|---|---|---|
| Paraffin oil | 5.00 | 5.00 |
| Isopropyl palmitate | 5.00 | 5.00 |
| Cetyl alcohol | 2.00 | 2.00 |
| Beeswax | 2.00 | 2.00 |
| Ceteareth-20 | 2.00 | 2.00 |
| PEG-20-glyceryl stearate | 1.50 | 1.50 |
| Glycerol | 3.00 | 3.00 |
| Phenoxyethanol | 0.50 | — |
| Parabens (mixture of methyl, ethyl, propyl, butyl, isobutyl paraben) | — | 0.50 |
| Perfume oil B1 or B2 | 0.50 | 0.50 |
| Water | to 100 | to 100 |

Composition of the Perfume Oil B1 or B2

| Fragrances | Parts by weight | |
|---|---|---|
| | Perfume oil B1 (comparison) | Perfume oil B2 (according to the invention) |
| NONADIENAL TRANS, CIS-2.6 5% TEC 20% DPG | 2.0 | 2.0 |
| ETHYL ACETOACETATE | 3.0 | 3.0 |
| FARENAL ® 10% DPG | 5.0 | 5.0 |
| VERTOCITRAL | 3.0 | 3.0 |
| CYCLOGALBANAT® 10% DPG | 2.0 | 2.0 |
| STYRALYL ACETATE | 3.0 | 3.0 |
| MELONAL ® | 0.5 | 0.5 |
| DIHYDROMYRCENOL | 15.0 | 15.0 |
| LINALYL ACETATE | 20.0 | 20.0 |
| LEMON OIL TERPENE FLAVOR WONF | 8.0 | 8.0 |
| EUCALYPTOL NATURAL. 10% DPG | 0.5 | 0.5 |
| HEXYL ACETATE | 1.5 | 1.5 |
| ISOAMYL ACETATE 10% DPG | 4.0 | 4.0 |
| PRENYL ACETATE 10% DPG | 4.0 | 4.0 |
| ALDEHYDE C14 SO-CALLED | 2.0 | 2.0 |
| ETHYL METHYL BUTYRATE-2 | 1.0 | 1.0 |
| ALLYL CYCLOHEXYL PROPIONATE | 2.0 | 2.0 |
| ALDEHYDE C16 SO-CALLED | 1.0 | 1.0 |
| FRAGOLANE ® | 0.5 | 0.5 |
| MAJANTOL ® | 25.0 | 25.0 |
| LINALOOL | 40.0 | 40.0 |
| DIMETHYL BENZYL CARBINOL | 10.0 | 10.0 |
| TERPINEOL PURE | 10.0 | 10.0 |
| PHENIRAT ® | 30.0 | 30.0 |
| CITRONELLOL 950 | 15.0 | 15.0 |
| GERANIOL 60 | 10.0 | 10.0 |
| CITRONELLYL ACETATE EXTRA | 2.0 | 2.0 |
| HEDIONE | 90.0 | 90.0 |
| HEXYL CINNAMIC ALDEHYDE ALPHA | 35.0 | 35.0 |

| Fragrances | Parts by weight | |
|---|---|---|
| | Perfume oil B1 (comparison) | Perfume oil B2 (according to the invention) |
| HEXYL SALICYLATE | 160.0 | 160.0 |
| METHYL OCTIN CARBONATE 10% DPG | 2.0 | 2.0 |
| CALONE 1951 10% DPG | 1.0 | 1.0 |
| GALAXOLIDE 50% IN IPM | 20.0 | 20.0 |
| ANETHOLE SUPRA 21.5 CELSIUS | 2.0 | 2.0 |
| AGRUMEX HC | 15.0 | 15.0 |
| ORYCLON SPECIAL | 40.0 | 40.0 |
| 3-[(4R)-4-Isopropylcyclohexen-1-yl]propanal | | 15.0 |
| DIPROPYLENE GLYCOL | 415.0 | 400.0 |
| | 1000.0 | 1000.0 |

At a dosage of 0.5 wt % of perfume oil B1 or B2 in the body lotion, the findings are as follows: due to the proportion of 3-[(4R)-4-isopropylcyclohexen-1-yl]propanal, the body lotion containing perfume oil B2 has a stronger and more natural floral note than the body lotion that contains perfume oil B1 (without 3-[(4R)-4-isopropylcyclohexen-1-yl]propanal). Furthermore, the body lotion with perfume oil B2 displays a more cosmetic top note and a creamier bottom note than the body lotion with perfume oil 1B1; on the whole, addition of 3-[(4R)-4-isopropylcyclohexen-1-yl]propanal results in an odor impression reminiscent of lily of the valley.

Example 11: Fabric Softener

| Material | Manufacturer | Chemical name | Function | wt % |
|---|---|---|---|---|
| Deionized water | | Water | Solvent | 72.4 |
| Rewoquat WE 18 | Evonik Goldschmidt GmbH | Dialkylesterammonium ethosulfate | Cationic surfactant | 16.6 |
| Mergal K9N | Honeywell Austria GmbH | 5-Chloro-2-methyl-3-(2H)-isothiazolone and 2-methyl-3-(2H)-isothiazolone | Preservative | 0.10 |
| Dow Corning 1520 Antifoam | Dow Corning GmbH, | Polydimethylsiloxane | Antifoaming agent | 0.30 |
| Magnesium chloride 1% solution | | Magnesium chloride solution | Consistency agent | 10.00 |
| Perfume Oil C1 or C2 | Symrise | | Perfume (fragrance) | 0.60 |

Composition of Perfume Oil C1 or C2

| Fragrances | Parts by weight | |
|---|---|---|
| | Perfume oil C1 (comparison) | Perfume oil C2 (according to the invention) |
| ALDEHYDE C10 | 0.5 | 0.5 |
| ALDEHYDE C11 ISO | 2.0 | 2.0 |
| ALDEHYDE C11 UNDECYLENIC | 12.0 | 12.0 |
| ALDEHYDE C12 MNA | 6.0 | 6.0 |
| FARENAL ® | 1.0 | 1.0 |
| VERTOCITRAL | 8.0 | 8.0 |
| ALLYL AMYL GLYCOLATE | 1.0 | 1.0 |
| STYRALYL ACETATE | 1.5 | 1.5 |
| DIHYDROMYRCENOL | 65.0 | 65.0 |
| AGRUNITRIL | 1.0 | 1.0 |
| PEONILE | 15.0 | 15.0 |
| METHYL ANTHRANILATE | 10.0 | 10.0 |
| NEROLIONE 10% DPG | 1.5 | 1.5 |
| ROSEMARY OIL BM | 7.0 | 7.0 |
| SAGE OFFICINALE OIL DALM. | 3.0 | 3.0 |
| ISOBORNYL ACETATE | 40.0 | 40.0 |
| PRENYL ACETATE | 0.5 | 0.5 |
| ISOAMYL BUTYRATE E | 0.5 | 0.5 |
| ALDEHYDE C14 SO-CALLED | 5.0 | 5.0 |

-continued

| Fragrances | Perfume oil C1 (comparison) | Perfume oil C2 (according to the invention) |
|---|---|---|
| MANZANATE | 0.5 | 0.5 |
| MUGETANOL | 5.0 | 5.0 |
| DIMETHYL BENZYL CARBINYL ACETATE | 2.5 | 2.5 |
| ROSE OXIDE D | 3.0 | 3.0 |
| ANTHER | 0.5 | 0.5 |
| PHENYLETHYL ALCOHOL | 35.0 | 35.0 |
| CITRONELLOL 950 | 15.0 | 15.0 |
| GERANIOL 60 | 10.0 | 10.0 |
| ISODAMASCON ® | 2.0 | 2.0 |
| ROSACETATE | 35.0 | 35.0 |
| CRESYL METHYL ETHER PARA | 0.5 | 0.5 |
| BENZYL ACETATE | 20.0 | 20.0 |
| HEXYL CINNAMIC ALDEHYDE ALPHA | 40.0 | 40.0 |
| METHYL BENZOATE | 1.0 | 1.0 |
| AMYL SALICYLATE N/ISO | 10.0 | 10.0 |
| BENZYL SALICYLATE | 70.0 | 70.0 |
| MYSORE ACETATE | 15.0 | 15.0 |
| PARMANYL ® | 0.5 | 0.5 |
| EUGENOL | 10.0 | 10.0 |
| ETHYL VANILLIN | 0.5 | 0.5 |
| COUMARIN | 3.0 | 3.0 |
| AGRUMEX HC | 45.0 | 45.0 |
| HERBAFLORAT | 25.0 | 25.0 |
| AMBERWOOD ® F | 5.0 | 5.0 |
| ISO E SUPER | 170.0 | 170.0 |
| PATCHOULI OIL DECOL. | 2.5 | 2.5 |
| SANDRANOL ® | 10.0 | 10.0 |
| ISOBUTYL QUINOLINE | 1.0 | 1.0 |
| EVERNYL | 0.5 | 0.5 |
| AMBROXIDE | 1.0 | 1.0 |
| GALAXOLIDE 50% IN IPM | 120.0 | 120.0 |
| INDOFLOR ® CRYST. | 0.5 | 0.5 |
| 3-[(4R)-4-Isopropylcyclohexen-1-yl]propanal | | 60.0 |
| DIPROPYLENE GLYCOL | 220.0 | 160.0 |
| | 1000.0 | 1000.0 |

At a dosage of 0.6 wt % of perfume oil C1 or 02 in the fabric softener, the findings are as follows: due to the proportion of 3-[(4R)-4-isopropylcyclohexen-1-yl]propanal, the fabric softener containing perfume oil 02 has a more natural, fresher floral note than the fabric softener that contains perfume oil C1 (without 3-[(4R)-4-isopropylcyclohexen-1-yl]propanal); on the whole, addition of 3-[(4R)-4-isopropylcyclohexen-1-yl]propanal results in an odor impression reminiscent of lily of the valley.

Example 12: Soap

| Material | Manufacturer | Chemical name | Function | wt % |
|---|---|---|---|---|
| Deionized water | | Water | Solvent | 2.0 |
| Soap Base Mix | Various | Sodium tallowates/palmitates | Surfactants | 95.8 |
| Titanium dioxide | Kronos Titan GmbH, Germany | Titanium dioxide | Pigment/Lightening agent | 1.0 |
| Perfume oil D1 or D2 | Symrise | | Perfume (fragrance) | 1.2 |

Composition of Perfume Oil D1 or D2

| Fragrances | Perfume oil D1 (comparison) | Perfume oil D2 (according to the invention) |
|---|---|---|
| ALDEHYDE C 8 | 10.0 | 10.0 |
| ALDEHYDE C10 | 14.0 | 14.0 |
| ALDEHYDE C11 UNDECYLIC | 5.0 | 5.0 |
| ALDEHYDE C12 MNA | 4.0 | 4.0 |
| ISOAMYL ALCOHOL | 6.0 | 6.0 |
| VERTOCITRAL | 4.0 | 4.0 |

-continued

| Fragrances | Parts by weight | |
|---|---|---|
| | Perfume oil D1 (comparison) | Perfume oil D2 (according to the invention) |
| ALLYL AMYL GLYCOLATE | 4.0 | 4.0 |
| DIHYDROMYRCENOL | 120.0 | 120.0 |
| CITRAL 95 | 30.0 | 30.0 |
| AGRUNITRIL | 80.0 | 80.0 |
| CITRONITRILE | 40.0 | 40.0 |
| CITRYLAL | 4.0 | 4.0 |
| ORANGE OIL TERPENES | 250.0 | 250.0 |
| METHYL ANTHRANILATE | 1.5 | 1.5 |
| TERPINEOL HEAD FRACTION | 10.0 | 10.0 |
| EUCALYPTOL NAT. | 10.0 | 10.0 |
| THYMOL CRYST | 6.0 | 6.0 |
| BORNYL ACETATE L CRYST. | 82.5 | 82.5 |
| CAMPHOR DL | 20.0 | 20.0 |
| JASMAPRUNAT | 5.0 | 5.0 |
| ALDEHYDE C14 SO-CALLED | 2.0 | 2.0 |
| MANZANATE | 0.5 | 0.5 |
| ALLYL HEPTOATE | 2.5 | 2.5 |
| ROSE OXIDE L | 0.5 | 0.5 |
| DAMASCONE ALPHA | 0.5 | 0.5 |
| HEDIONE | 10.0 | 10.0 |
| AMYL SALICYLATE N/ISO | 60.0 | 60.0 |
| HEXYL SALICYLATE | 35.0 | 35.0 |
| COUMARIN | 2.5 | 2.5 |
| AGRUMEX HC | 30.0 | 30.0 |
| ORYCLON SPECIAL | 55.0 | 55.0 |
| PATCHOULI OIL DECOL. | 2.0 | 2.0 |
| SANDRANOL ® | 1.5 | 1.5 |
| TONALIDE | 2.0 | 2.0 |
| 3-[(4R)-4-Isopropylcyclohexen-1-yl]propanal | | 40.0 |
| DIPROPYLENE GLYCOL | 130.0 | 90.0 |
| | 1000.0 | 1000.0 |

At a dosage of 1.2 wt % of perfume oil D or D2 in the soap, the findings are as follows: due to the proportion of 3-[(4R)-4-isopropylcyclohexen-1-yl]propanal, the soap containing perfume oil D2 has a round, aldehyde note, in contrast to the soap that contains perfume oil D1 (without 3-[(4R)-4-isopropylcyclohexen-1-yl]propanal). Furthermore, the soap with perfume oil D2 radiates more naturalness and fullness than the soap with perfume oil D1; on the whole, addition of 3-[(4R)-4-isopropylcyclohexen-1-yl]propanal results in an odor impression reminiscent of lily of the valley.

Example 13: Washing Powder

| Material | Manufacturer | Chemical name | Function | wt % |
|---|---|---|---|---|
| Sodium metasilicate pentahydrate | Akzo Nobel Chemicals, Germany | Sodium metasilicate pentahydrate | | 48.0 |
| Sodium hydrogen carbonate | Various | Sodium hydrogen carbonate | Alkali | 15.0 |
| Sodium percarbonate | Various | Sodium carbonate peroxyhydrate | Bleach | 15.0 |
| Peractive AC blue | Clariant GmbH, Germany | TAED/Na-carboxymethylcellulose | Activator | 5.00 |
| Genapol OA-080 | Clariant GmbH, Germany | Oxoalcohol C14-15, 8EO | Non-ionic surfactant | 3.00 |
| Texapon K12 powder | Cognis Germany GmbH | Sodium lauryl sulfate C12 | Anionic surfactant | 7.00 |
| Tinopal CBS-X | Ciba, Germany | | Brightener | 0.50 |
| Savinase 6.0 T, Type W | Novozymes | Protease | Enzyme | 0.40 |
| Termamyl 120 T | Novozymes | Alpha-amylase | Enzyme | 0.30 |
| Sodium sulfate | Various | Sodium sulfate | Filler | 5.50 |
| Perfume oil E1 or E2 | Symrise | | Perfume (fragrance) | 0.30 |

Composition of Perfume Oil E1 or E2

| Fragrances | Parts by weight | |
|---|---|---|
| | Perfume oil E1 (comparison) | Perfume oil E2 (according to the invention) |
| ALDEHYDE C 8 | 0.5 | 0.5 |
| HEXENOL CIS-3 | 3.5 | 3.5 |
| VERTOCITRAL | 15.0 | 15.0 |
| STYRALYL ACETATE | 3.0 | 3.0 |
| MELONAL ® | 2.0 | 2.0 |
| DIHYDROMYRCENOL | 60.0 | 60.0 |
| CITRAL 95 | 6.0 | 6.0 |
| ORANGE OIL TERPENES | 20.0 | 20.0 |
| EUCALYPTUS OIL GLOBULUS 80/85% | 10.0 | 10.0 |
| MENTHONE L/ISOMENTHONE D 82/18 | 1.5 | 1.5 |
| HEXYL ACETATE 10% DPG | 5.0 | 5.0 |
| ISOPENTYRATE | 4.0 | 4.0 |
| ETHYL CAPROATE | 1.0 | 1.0 |
| ETHYL METHYL BUTYRATE-2 | 6.0 | 6.0 |
| LINALOOL | 10.0 | 10.0 |
| DIMETHYL BENZYL CARBINYL BUTYRATE | 15.0 | 15.0 |
| PHENYLETHYL ALCOHOL | 15.0 | 15.0 |
| CITRONELLOL 950 | 20.0 | 20.0 |
| GERANIOL 60 | 20.0 | 20.0 |
| ISODAMASCON ® | 10.0 | 10.0 |
| CRESYL METHYL ETHER PARA | 1.0 | 1.0 |
| BENZYL ACETONE | 50.0 | 50.0 |
| HEXYL CINNAMIC ALDEHYDE ALPHA | 60.0 | 60.0 |
| DIHYDROJASMONE | 1.0 | 1.0 |
| METHYL BENZOATE | 0.5 | 0.5 |
| HEXYL SALICYLATE | 10.0 | 10.0 |

| Fragrances | Parts by weight | |
|---|---|---|
| | Perfume oil E1 (comparison) | Perfume oil E2 (according to the invention) |
| LEGUMINAL | 6.0 | 6.0 |
| IONONE BETA | 20.0 | 20.0 |
| ISORALDEINE 70 | 45.0 | 45.0 |
| EUGENOL | 2.0 | 2.0 |
| ACETOPHENONE 1% DPG | 5.0 | 5.0 |
| AGRUMEX HC | 60.0 | 60.0 |
| ORYCLON SPECIAL | 40.0 | 40.0 |
| HERBAFLORAT | 10.0 | 10.0 |
| HERBYL PROPIONATE | 20.0 | 20.0 |
| KOAVONE | 20.0 | 20.0 |
| VERTOFIX | 40.0 | 40.0 |
| ISO E SUPER | 150.0 | 150.0 |
| SANDRANOL ® | 20.0 | 20.0 |
| AMBROXIDE | 2.0 | 2.0 |
| 3-[(4R)-4-Isopropylcyclohexen-1-yl]propanal | | 60.0 |
| DIPROPYLENE GLYCOL | 270.0 | 210.0 |
| | 1000.0 | 1000.0 |

At a dosage of 0.3 wt % of perfume oil E1 or E2 in the washing powder (powder detergent), the findings are as follows: the proportion of 3-[(4R)-4-isopropylcyclohexen-1-yl]propanal produces, in the washing powder containing perfume oil E2, an intensification of the green notes relative to the washing powder that contains perfume oil E1 (without 3-[(4R)-4-isopropylcyclohexen-1-yl]propanal). Furthermore, the composition of the washing powder with perfume oil E2 radiates altogether more freshness than the washing powder with perfume oil E1; on the whole, addition of 3-[(4R)-4-isopropylcyclohexen-1-yl]propanal results in an odor impression reminiscent of lily of the valley.

Example 14: General-Purpose Cleaner

| Material | Manufacturer | Chemical name | Function | wt % |
|---|---|---|---|---|
| Deionized water | | Water | Solvent | 59.6 |
| Mergal K9N | Troy Chemie, Seelze | 5-Chloro-2-methyl-3-(2H)-isothiazolone and 2-methyl-3-(2H)-isothiazolone | Preservative | 0.1 |
| Trisodium citrate dihydrate | Various | Trisodium citrate dihydrate | Complexing agent | 3.0 |
| Zetesol NL-2 | Zschimmer & Schwarz, Germany | Fatty alcohol C12-14-sulfate, sodium | Anionic surfactant | 30.0 |
| Imbentin C/125/055 | Dr. W. Kolb AG chem. | Fatty alcohol C12-C15, 8EO | Non-ionic surfactant | 5.0 |
| Ethanol 96% | Various | Ethanol | Solvent | 2.0 |
| Perfume oil F1 or F2 | Symrise | | Perfume (fragrance) | 0.3 |

Composition of Perfume Oil F1 or F2:

| Fragrances | Parts by weight | |
|---|---|---|
| | Perfume oil F1 (comparison) | Perfume oil F2 (according to the invention) |
| ALDEHYDE C10 | 0.5 | 0.5 |
| ALCOHOL C10 | 6.0 | 6.0 |
| HEXENOL CIS-3 | 1.0 | 1.0 |
| LIMONENAL | 4.0 | 4.0 |
| VERTOCITRAL | 8.0 | 8.0 |
| PHENYLACETALDEHYDE 50% DPG | 1.0 | 1.0 |
| MINTONAT | 15.5 | 15.5 |
| METHYL ANTHRANILATE | 1.0 | 1.0 |
| HEXYL ACETATE | 20.0 | 20.0 |
| ALLYL HEPTOATE | 1.0 | 1.0 |
| LINALOOL | 30.0 | 30.0 |
| DIMETHYL BENZYL CARBINYL ACETATE | 2.0 | 2.0 |
| PHENYLETHYL ALCOHOL | 150.0 | 150.0 |

|   | Parts by weight | |
|---|---|---|
| Fragrances | Perfume oil F1 (comparison) | Perfume oil F2 (according to the invention) |
| CITRONELLOL 950 | 130.0 | 130.0 |
| GERANIOL SUPER | 35.0 | 35.0 |
| GERANYL ACETATE PURE | 10.0 | 10.0 |
| BENZYL ACETATE | 55.0 | 55.0 |
| HEDIONE | 15.0 | 15.0 |
| HEXYL CINNAMIC ALDEHYDE ALPHA | 130.0 | 130.0 |
| CINNAMIC ALCOHOL | 6.0 | 6.0 |
| ACETOPHENONE 10% DPG | 1.0 | 1.0 |
| JACINTHAFLOR ® | 4.0 | 4.0 |
| ISO E SUPER | 20.0 | 20.0 |
| GALAXOLIDE 50% IN IPM | 35.0 | 35.0 |
| INDOFLOR ® CRYST. | 1.0 | 1.0 |
| BHT IONOL | 8.0 | 8.0 |
| 3-[(4R)-4-Isopropylcyclohexen-1-yl]propanal |  | 60.0 |
| DIPROPYLENE GLYCOL | 370.0 | 310.0 |
|  | 1000.0 | 1000.0 |

At a dosage of 0.3 wt % of perfume oil F1 or F2 in the general-purpose cleaner, the findings are as follows: the proportion of 3-[(4R)-4-isopropylcyclohexen-1-yl]propanal produces, in the general-purpose cleaner containing perfume oil F2, an intensification of the floral note relative to the general-purpose cleaner that contains perfume oil F1 (without 3-[(4R)-4-isopropylcyclohexen-1-yl]propanal). Moreover, the composition of the general-purpose cleaner with perfume oil F2 seems much creamier and fresher than that of the general-purpose cleaner with perfume oil F1; on the whole, addition of 3-[(4R)-4-isopropylcyclohexen-1-yl]propanal results in an odor impression reminiscent of lily of the valley.

Example 15: Shampoo

| Material | Manufacturer | INCI Name | wt % |
|---|---|---|---|
| Deionized water |  | Water | 71.5 |
| Plantacare PS 10 | Cognis Germany GmbH | Sodium Laureth Sulfate, Lauryl Glucoside | 20.0 |
| Euperlan PK 771 | Cognis Germany GmbH | Glycol Distearate, Sodium Lauryl Sulfate, Cocamide MEA, Laureth-10 | 6.0 |
| Dragocid Liquid | Symrise | Phenoxyethanol, Methylparaben, Ethylparaben, Butylparaben, Propylparaben, Isobutylparaben | 0.5 |
| Sodium chloride |  | Sodium Chloride | 1.4 |
| Citric acid monohydrate crystalline |  | Citric Acid | 0.1 |
| Perfume oil G1 or G2 | Symrise | Perfume (Fragrance) | 0.5 |

Composition of Perfume Oil G1 or G2:

|  | Parts by weight | |
|---|---|---|
| Fragrances | Perfume oil G1 (comparison) | Perfume oil G2 (according to the invention) |
| FARENAL ® | 3.0 | 3.0 |
| FLORAZON | 0.5 | 0.5 |
| HEXENYL ACETATE CIS-3 | 3.0 | 3.0 |
| VERTOCITRAL | 1.0 | 1.0 |
| DYNASCONE 10% DPG | 2.0 | 2.0 |
| CYCLOGALBANAT ® | 2.0 | 2.0 |
| STYRALYL ACETATE | 1.5 | 1.5 |
| DIHYDROMYRCENOL | 6.0 | 6.0 |
| OXANTHIA 50% IN TEC 10% DPG | 10.0 | 10.0 |
| LEMON OIL ITAL. | 10.0 | 10.0 |
| ORANGE OIL BRASIL | 50.0 | 50.0 |
| HEXYL ACETATE | 2.0 | 2.0 |

| Fragrances | Parts by weight | |
|---|---|---|
| | Perfume oil G1 (comparison) | Perfume oil G2 (according to the invention) |
| ISOAMYL ACETATE | 0.5 | 0.5 |
| PRENYL ACETATE | 0.5 | 0.5 |
| ETHYL BUTYRATE 10% DPG | 2.0 | 2.0 |
| ALDEHYDE C14 SO-CALLED | 25.0 | 25.0 |
| DECALACTONE GAMMA | 5.0 | 5.0 |
| ETHYL METHYL BUTYRATE-2 | 1.0 | 1.0 |
| ALLYL CAPROATE | 1.5 | 1.5 |
| ALLYL CYCLOHEXYL PROPIONATE | 3.0 | 3.0 |
| ALLYL HEPTOATE | 2.5 | 2.5 |
| MELOZONE | 2.0 | 2.0 |
| CALONE 1951 | 0.5 | 0.5 |
| MUGETANOL | 10.0 | 10.0 |
| LINALOOL | 25.0 | 25.0 |
| DIMETHYL BENZYL CARBINYL ACETATE | 6.0 | 6.0 |
| DIMETHYL BENZYL CARBINYL BUTYRATE | 4.0 | 4.0 |
| PHENYLETHYL ACETATE | 1.5 | 1.5 |
| PHENYLETHYL ALCOHOL | 15.0 | 15.0 |
| CITRONELLOL 950 | 10.0 | 10.0 |
| GERANIOL SUPER | 5.0 | 5.0 |
| GERANYL ACETATE PURE | 15.0 | 15.0 |
| ISODAMASCON® | 2.0 | 2.0 |
| BENZYL ACETATE | 15.0 | 15.0 |
| HEDIONE | 90.0 | 90.0 |
| HEXYL CINNAMIC ALDEHYDE ALPHA | 35.0 | 35.0 |
| JASMONE CIS | 0.5 | 0.5 |
| BENZYL SALICYLATE | 80.0 | 80.0 |
| HEXENYL SALICYLATE CIS-3 | 30.0 | 30.0 |
| ISORALDEINE 70 | 35.0 | 35.0 |
| HERBAFLORAT | 15.0 | 15.0 |
| ISO E SUPER | 15.0 | 15.0 |
| ISOBORNYL CYCLOHEXANOL | 30.0 | 30.0 |
| BRAHMANOL ® | 10.0 | 10.0 |
| AMBROXIDE | 1.5 | 1.5 |
| GLOBALIDE ® | 5.0 | 5.0 |
| GALAXOLIDE 50% IN DPG | 120.0 | 120.0 |
| 3-[(4R)-4-Isopropylcyclohexen-1-yl]propanal | | 65.0 |
| DIPROPYLENE GLYCOL | 290.0 | 225.0 |
| | 1000.0 | 1000.0 |

At a dosage of 0.5 wt % of perfume oil G1 or G2 in the shampoo, the findings are as follows: addition of 3-[(4R)-4-isopropylcyclohexen-1-yl]propanal intensifies, in the shampoo containing perfume oil G2, the watery-fruity character relative to the shampoo that contains perfume oil G1 (without 3-[(4R)-4-isopropylcyclohexen-1-yl]propanal). Moreover, in the shampoo with perfume oil G2, the diffusivity is increased relative to the shampoo with perfume oil G1; on the whole, addition of 3-[(4R)-4-isopropylcyclohexen-1-yl]propanal results in an odor impression reminiscent of lily of the valley.

Example 16: Shower Gel

| Material | Manufacturer | INCI Name | wt % |
|---|---|---|---|
| Deionized water | | Water | 76.3 |
| Plantacare PS 10 | Cognis Germany GmbH | Sodium Laureth Sulfate, Lauryl Glucoside | 20.0 |
| Dragocid liquid | Symrise | Phenoxyethanol, Methylparaben, Ethylparaben, Butylparaben, Propylparaben, Isobutylparaben | 0.5 |
| Sodium chloride | | Sodium Chloride | 1.4 |
| Citric acid monohydrate crystalline | | Citric Acid | 1.3 |
| Perfume oil G1 or G2 from example 15 | Symrise | Perfume (Fragrance) | 0.5 |

At a dosage of 0.5 wt % of perfume oil G1 or G2 in the shower gel, the findings are as follows: the addition of 3-[(4R)-4-isopropylcyclohexen-1-yl]propanal endows the shower gel containing perfume oil G2 with a more natural and caring note relative to the shower gel that contains perfume oil G1 (without 3-[(4R)-4-isopropylcyclohexen-1-yl]propanal); on the whole, addition of 3-[(4R)-4-isopropylcyclohexen-1-yl]propanal results in an odor impression reminiscent of lily of the valley.

Example 17: Transparent Deodorant Sticks (Formulations A and B) or Deodorant Cream Sticks (Formulations C and D)

| Component | A wt % | B wt % | C wt % | D wt % |
|---|---|---|---|---|
| Aluminum zirconium tetrachlorohydrate - glycine complex | 25.00 | 20.00 | 25.00 | 20.00 |
| Dimethicone (10 cst) | — | — | 5.00 | 5.00 |
| Cyclopentasiloxane | — | 0.50 | 1.00 | 0.50 |
| Petroleum jelly | 5.00 | 4.70 | 5.00 | 5.00 |
| Ozokerite | 1.00 | 1.50 | — | — |
| Stearyl alcohol | 12.00 | 12.00 | — | — |
| 2-Butyloctanoic acid | 0.50 | — | 0.50 | — |
| Wax | — | — | 1.25 | 1.25 |
| PPG-14 butyl ether | 9.00 | 9.00 | — | — |
| Hardened rapeseed oil | — | — | 5.00 | 5.00 |
| Silicon dioxide | — | — | 1.00 | — |
| Farnesol | 0.25 | — | 0.25 | — |
| Paraffin oil | 0.50 | 0.50 | — | — |
| Hydrogenated castor oil (castor wax) | 3.50 | 3.50 | — | — |
| Talc | 4.00 | 4.00 | — | — |
| Behenyl alcohol | 0.20 | 0.20 | — | — |
| d-Panthenyltriacetate | 1.00 | 1.00 | — | — |
| Preservative | q.s. | q.s. | q.s. | q.s. |
| Perfume oil H1 or H2 | 1.50 | — | 1.15 | — |
| Perfume oil G2 from example 15 | — | 0.90 | — | 0.75 |
| Water | to 100 | to 100 | to 100 | to 100 |

Example 18: Antiperspirant Roll-on

| Component | wt % | wt % |
|---|---|---|
| Caprylyl trimethicone (SilCare TM Silicone 31 M 50) | 0.30 | 0.30 |
| Steareth-20 (GENAPOL TM HS 200) | 3.00 | 3.00 |
| Steareth-2 (GENAPOL TM HS 020) | 1.50 | 1.50 |
| Dicaprylyl ether (Cetiol TM OE) | 2.00 | 2.00 |
| Coco caprylate/caprate (Cetiol TM LC) | 2.00 | 2.00 |
| Glycerin | 2.00 | 2.00 |
| Glyceryl stearate (Cutina TM GMS) | 2.00 | 2.00 |
| Octyldodecanol (Eutanol TM G) | 1.00 | 1.00 |
| Stearyl alcohol | 2.50 | 2.50 |
| Aluminum chlorohydrate according to example 1 of EP 1321431 | 10.00 | 10.00 |
| Avocado Extract *Persea Gratissima* | 0.30 | 0.20 |
| Perfume oil G2 from example 15 | 0.50 | — |
| Perfume oil H2 from example 17 | — | 0.60 |
| Water | to 100 | to 100 |

Example 19: Antiperspirant Stick

| Component | wt % | wt % |
|---|---|---|
| Phenyl trimethicone (SilCare TM Silicone 15 M 50) | 13.50 | 13.50 |
| Cetearyl alcohol | to 100 | to 100 |
| Cetiol CC (dicaprylyl carbonate) | 13.50 | 13.50 |
| Stearic acid | 3.50 | 3.50 |

Composition of Perfume Oil H1 or H2

| Fragrances | Perfume oil H1 (comparison) Parts by weight | Perfume oil H2 (according to the invention) Parts by weight |
|---|---|---|
| ALDEHYDE C10 | 0.5 | 0.5 |
| ALDEHYDE C12 MNA 10% DPG | 2.0 | 2.0 |
| MINTONAT | 40.0 | 40.0 |
| MELOZONE | 0.5 | 0.5 |
| VERTOCITRAL | 6.0 | 6.0 |
| DIHYDRO MYRCENOL | 120.0 | 120.0 |
| TETRAHYDRO MYRCENOL | 10.0 | 10.0 |
| AGRUNITRIL | 1.0 | 1.0 |
| ORANGE OIL BRASIL | 10.0 | 10.0 |
| TAMARINE TYPE BASE | 10.0 | 10.0 |
| HEXYL ACETATE | 6.0 | 6.0 |
| ALDEHYDE C14 SO-CALLED | 1.0 | 1.0 |
| TETRAHYDRO LINALOOL | 40.0 | 40.0 |
| DIMETHYL BENZYL CARBINYL BUTYRATE | 5.0 | 5.0 |
| ORANGE FLOWER ETHER | 5.0 | 5.0 |
| PHENYLETHYL ACETATE | 6.5 | 6.5 |
| PHENYLETHYL ALCOHOL | 15.0 | 15.0 |
| GERANIOL SUPER | 30.0 | 30.0 |
| ROSAPHEN ® | 25.0 | 25.0 |
| ISODAMASCON ® | 0.5 | 0.5 |
| HEDIONE | 300.0 | 300.0 |
| UNDECAVERTOL | 0.5 | 0.5 |
| ALLYL IONONE | 2.5 | 2.5 |
| IONONE BETA | 10.0 | 10.0 |
| EUGENOL | 4.0 | 4.0 |
| ISO E SUPER | 30.0 | 30.0 |
| BRAHMANOL ® | 2.0 | 2.0 |
| AMBROXIDE | 2.0 | 2.0 |
| GLOBALIDE ® | 12.0 | 12.0 |
| GLOBANONE ® | 8.0 | 8.0 |
| MACROLIDER SUPRA | 45.0 | 45.0 |
| 3-[(4R)-4-Isopropylcyclohexen-1-yl]propanal | — | 50.0 |
| DIPROPYLENE GLYCOL | 300.0 | 250.0 |
| | 1000.0 | 1000.0 |

-continued

| Component | wt % | wt % |
|---|---|---|
| PEG-40-hydrogenated castor oil (Emulsogen TM HCO 040) | 4.10 | 4.10 |
| PEG-8 distearate (Cithrol 4 DS) | 4.10 | 4.10 |
| Petroleum jelly | 6.90 | 6.90 |
| Aluminum chlorohydrate | 13.80 | 13.80 |
| Aluminum Zirconium Trichlorohydrex Gly | 19.50 | 20.00 |
| Ethylhexylglycerin (octoxyglycerin) | 0.30 | 0.20 |
| 4-Methyl-4-phenyl-2-pentanol (Vetikol) | 0.25 | 0.10 |
| Perfume oil A2 from example 9 | 1.00 | — |
| Perfume oil G2 from example 15 | — | 0.80 |

Example 20: Aerosol Spray

| Component | wt % | wt % | wt % |
|---|---|---|---|
| Octyldodecanol | 0.50 | — | 0.50 |
| Phenoxyethanol | — | — | 0.30 |
| 1,2-Pentanediol | 1.00 | 1.00 | 0.50 |
| 1,2-Hexanediol | 0.25 | 0.15 | 0.25 |
| 1,2-Octanediol | 0.25 | 0.25 | 0.25 |
| Farnesol | — | 0.25 | 0.15 |
| Ethylhexylglycerin (octoxyglycerin) | 0.50 | 0.30 | 0.50 |
| Perfume oil A2 from example 9 | 0.80 | — | 0.50 |
| Perfume oil H2 from example 17 | — | 1.15 | 0.50 |
| Ethanol | to 100 | to 100 | to 100 |

The mixture obtained after mixing the components given in each case is filled with a propane-butane mixture (2:7) in the weight ratio 2:3 in an aerosol container.

Example 21: Hair Conditioner with UV Protection

| Component | INCI Name | wt % | wt % |
|---|---|---|---|
| Lanette O | Cetearyl Alcohol | 4.00 | 4.00 |
| Dragoxat 89 | Ethylhexyl Isononanoate | 4.00 | 4.00 |
| Emulsiphos | Potassium Cetyl Phosphate, Hydrogenated Palm Glycerides | 0.50 | 0.50 |
| Natrosol 250 HR | Hydroxyethylcellulose | 0.25 | 0.25 |
| Neo Heliopan Hydro | Phenylbenzimidazole Sulfonic Acid | 2.00 | 2.00 |
| L-arginine | Arginine | 1.20 | 1.20 |
| Benzophenone-4 | Benzophenone-4 | 0.50 | 0.50 |
| Neo Heliopan AP | Disodium Phenyl Dibenzimidazole Tetrasulfonate | 0.50 | 1.00 |
| Edeta BD | Disodium EDTA | 0.05 | 0.05 |
| Dragocide liquid | Phenoxyethanol (=and) Methylparaben (=and) Butylparaben (=and) Ethylparaben (=and) Propylparaben | 0.80 | 0.80 |
| Dow Corning 949 cationic emulsion | Amodimethicone, Cetrimonium Chloride, Trideceth-12 | 2.00 | 2.00 |
| Dow Corning 5200 | Laurylmethicone Copolyol | 0.50 | 0.50 |
| Perfume oil B2 from example 10 | Perfume | 0.95 | — |
| Perfume oil H2 from example 17 | Perfume | | 1.25 |
| Water | Water (Aqua) | to 100 | to 100 |

Example 22: Sunscreen Spray

| Part | Raw materials | INCI Designation | wt % |
|---|---|---|---|
| A | Water, demineralized | Water (aqua) | 69.50 |
| | Glycerol | Glycerol | 4.00 |
| | 1,3-Butylene glycol | Butylene Glycol | 5.00 |
| | D-panthenol | Panthenol | 0.50 |
| | Lara care A-200 | Galactoarabinan | 0.25 |
| B | Baysilone oil M 10 | Dimethicone | 1.00 |
| | Edeta BD | Disodium EDTA | 0.10 |
| | Copherol 1250 | Tocopheryl Acetate | 0.50 |
| | Cetiol OE | Dicaprylyl Ether | 3.00 |
| | Neo Heliopan ® HMS | Homosalate | 5.00 |
| | Neo Heliopan ® AV | Ethylhexyl Methoxycinnamate | 6.00 |
| | Neo Heliopan ® 357 | Butyl Methoxydibenzoylmethane | 1.00 |
| | Corapan TQ | Diethylhexylnaphthalate | 2.00 |
| | Alpha Bisabolol | Bisabolol | 0.10 |
| | Pemulen TR-2 | Acrylates/C10-30 Alkyl Acrylate Crosspolymer | 0.25 |
| C | Phenoxyethanol | Phenoxyethanol | 0.70 |
| | Solbrol M | Methylparaben | 0.20 |
| | Solbrol P | Propylparaben | 0.10 |
| D | NAOH, 10% | Sodium Hydroxide | 0.60 |
| E | Perfume oil B2 from example 10 | Fragrance (Perfume) | 0.20 |

Method of production: Dissolve Lara Care A-200 in the other constituents of part A, with stirring. Weigh out all the raw materials of part B (without Pemulen) and dissolve the crystalline substances, with heating. Add and disperse the Pemulen. Add part B to part A and homogenize for 1 minute. Add parts C-E and homogenize for a further 1-2 minutes with the Ultra Turrax.

Example 23: Sunscreen Soft Cream (W/O), Sun Protection Factor (SPF) 40

| Part | Raw materials | INCI designation | wt % |
|---|---|---|---|
| A | Dehymuls PGPH | Polyglyceryl-2 Dipolyhydroxy Stearate E | 5.00 |
| | Copherol 1250 | Tocopheryl Acetate E | 0.50 |
| | Permulgin 3220 | Ozokerite | 0.50 |
| | Zinc stearate | Zinc Stearate E | 0.50 |
| | Tegosoft TN | C12-15 Alkyl Benzoate E | 10.00 |
| | Neo Heliopan ® E1000 | Isoamyl-P-Methoxycinnamate E | 2.00 |
| | Neo Heliopan ® 303 | Octocrylene E | 5.00 |
| | Neo Heliopan ® MBC | 4-Methylbenzylidene Camphor | 3.00 |
| | Zinc oxide neutral | Zinc Oxide E | 5.00 |
| B | Water, distilled | Water (Aqua) | to 100 |
| | EDETA BD | Disodium EDTA | 0.10 |
| | Glycerin | Glycerin | 4.00 |
| | Phenoxyethanol | Phenoxyethanol | 0.70 |
| | Solbrol M | Methylparaben | 0.20 |
| | Solbrol P | Propylparaben | 0.10 |
| | Magnesium sulfate | Magnesium Sulfate | 0.50 |
| C | Perfume oil B2 from example 10 | Perfume (Fragrance) | 0.30 |

Method of production: Heat part A to approx. 85° C. Heat part B (without zinc oxide) to approx. 85° C.; add zinc oxide and disperse with the Ultra Turrax. Add B to A. Leave to cool, with stirring. Add part C and then homogenize.

Example 24: Sunscreen Milk (W/O)

| Part | Raw materials | INCI Designation | wt % |
|---|---|---|---|
| A | Dehymuls PGPH | Polyglyceryl-2 Dipolyhydroxystearate | 3.00 |
|  | Beeswax 8100 | Beeswax | 1.00 |
|  | Monomuls 90-O-18 | Glyceryl Oleate | 1.00 |
|  | Zinc stearate | Zinc Stearate | 1.00 |
|  | Cetiol SN | Cetearyl Isononanoate | 5.00 |
|  | Cetiol OE | Dicaprylyl Ether | 5.00 |
|  | Tegosoft TN | C12-15 Alkyl Benzoate | 4.00 |
|  | Vitamin E | Tocopherol | 0.50 |
|  | Solbrol P | Propylparaben | 0.10 |
|  | Neo Heliopan ® OS | Ethylhexyl Salicylate | 5.00 |
|  | Neo Heliopan ® AV | Ethylhexyl Methoxycinnamate | 7.50 |
|  | Uvinul ® T150 | Ethylhexyl Triazone | 1.50 |
| B | Water, distilled | Water (Aqua) | to 100 |
|  | Trilon BD | Disodium EDTA | 0.10 |
|  | Glycerin | Glycerin | 5.00 |
|  | Solbrol M | Methylparaben | 0.20 |
|  | Phenoxyethanol | Phenoxyethanol | 0.70 |
|  | Neo Heliopan ® AP 10% solution, neutralized with NAOH | Disodium Phenyl Dibenzimidazole Tetrasulfonate | 15.00 |
| C | Perfume oil G2 from example 15 | Perfume (Fragrance) | 0.25 |
|  | Alpha bisabolol | Bisabolol | 0.10 |

Method of production: Heat part A to approx. 85° C. Heat part B to approx. 85° C. Add B to A. Leave to cool, with stirring. Add part C and then homogenize.

Example 25: Permanent Hair Colorant

Part A—Hair Coloring Base:

| Raw materials | wt % |
|---|---|
| Sodium myreth sulfate (e.g. texapon K14 S/K, Cognis) | 2.80 |
| Linoleamidopropyl PG-dimonium chloride phosphate (Arlasilk Phospholipid EFA, Uniqema) | 1.00 |
| Caprylyl/capryl glucoside (Plantacare 810 UP, Cognis) | 2.00 |
| Sodium laureth-6 carboxylate (Akypo Soft 45 NV, Kao) | 10.00 |
| Cetearyl alcohol | 8.00 |
| Octyldodecanol | 1.00 |
| Ceteareth-12 | 0.50 |
| Ceteareth-20 | 0.50 |
| KOH, 50% in water | 0.70 |
| Toluene-2,5-diamine sulfate (oxidizing dye) | 0.90 |
| Resorcinol | 0.20 |
| m-Aminophenol | 0.06 |
| 4-Chlororesorcinol | 0.15 |
| Ascorbic acid | 0.10 |
| Sodium sulfite | 0.15 |
| Ammonia, 25% in water | 6.00 |
| Etidronic acid | 0.20 |
| Polyquaternium -2 (Mirapol A15, Rhodia) | 0.20 |
| Perfume oil G2 from example 15 | 0.30 |
| Water | 65.24 |

Part B—Developer.

| Raw materials | wt % |
|---|---|
| Cetostearyl alcohol | 8.00 |
| Ceteareth-20 | 2.50 |
| Steartrimonium chloride (Dehyquart B, Cognis) | 1.00 |
| 2,6-Dicarboxypyridine | 0.10 |
| Paraffin oil | 0.30 |
| Etidronic acid | 0.40 |
| Propylene glycol | 0.40 |
| Sodium benzoate | 0.04 |
| Hydrogen peroxide, 50% in water | 12.00 |
| KOH, 50% in water, added to pH = 3.5 | q.s. |
| Water | To 100 |

Application: The hair coloring basis according to the invention (part A) and the developer according to the invention (part B) are stirred together in a 1:1 weight ratio and applied to the hair.

Example 26: Hair Coloring Cream for a Blonde Shade

| Part | Material | Manufacturer | INCI Name | wt % |
|---|---|---|---|---|
| A | Oxowax | LCW, France | Cetyl alcohol, Oleyl alcohol, Cetearyl alcohol, Stearic acid | 21.00 |
|  | Volpo CS 25 | Croda GmbH, Germany | Ceteareth25 | 4.00 |
|  | Berol 175 | Brenntag eurochem GmbH, Germany | Laureth-8 | 10.00 |
|  | Lanette ® E | Cognis Germany GmbH | Sodium Cetearyl Sulfate | 1.00 |
|  | Covaquat 16 | LCW, France | Polyquaternium -6 | 4.00 |
|  | Water |  | Water (Aqua) | 49.30 |
| B | Ammonia (20% in water) | Merk Eurolab | Ammonia | 10.20 |
| C | Perfume oil G2 from example 15 | Symrise | Perfume | 0.50 |

Method of Production:

Mix together Part A, B and C except Covaquat 16 and heat for 20 minutes at 80° C. Once the product is homogeneous, leave to cool. Add Covaquat 16 at 50° C. When the product begins to thicken, stop stirring. Add NH$_4$OH at room temperature and stir the mixture until homogeneous.

Example 27: Air Freshener Aerosol Spray, Water-Based (w/o Alcohol)

| Material | Manufacturer | INCI Name | wt % |
|---|---|---|---|
| Imbentin C/125/030 | Symrise | C12-15 pareth-3 | 0.25 |
| Imbentin AG/100/080 | Symrise | deceth-8, Ziegler alcohol | 1.00 |
| Perfume oil H2 from example 17 | Symrise | Perfume | 1.25 |
| Water, demineralized |  | Aqua | 22.50 |
| Propellant gas 4.2 bar |  |  | 75.00 |

Method of production: Mix together all the raw materials in the order given.

Example 28: Liquid Air Freshener Pump-Spray

| Material | Manufacturer | INCI Name | wt % |
| --- | --- | --- | --- |
| Water, demineralized | | Aqua | 90.70 |
| Ethanol 96% | Symrise | Ethanol | 4.00 |
| Empilan KCL 11/90 | Stockmeier Chemie GmbH &Co. KG | Alcohol C12-15 11EO | 3.00 |
| Isopropanol | Symrise | Propan-2-ol | 1.00 |
| Sodium hydrogen carbonate p.a. | Symrise | Sodium bicarbonate | 0.20 |
| Parmetol A 26 | Hoesch Julius | Mixture of 5-chloro-2-methyl-2H-isothiazol-3-one and 2-methyl-2H-isothiazol-3-one | 0.10 |
| Perfume oil F2 from example 14 | Symrise | Perfume | 1.00 |

Method of production: Mix together all the raw materials in the order given. Adjust the pH.

Example 29: Deodorizing Air Freshener Pump/Wick 5% Fragrance

| Part | Material | Manufacturer | INCI Name | wt % |
| --- | --- | --- | --- | --- |
| A | Water, demineralized | | Aqua | 67.32 |
| | Sequion 40 NA 32 | Polygon Chemie | | 1.25 |
| | Triethanolamine pur C | Symrise | Triethanolamine | 0.30 |
| | Rewoderm S 1333 | Goldschmidt AG | DiNa-ricinoleamide of MEA-sulfosuccinate | 2.33 |
| | Tego Sorb Conc. 50 | Evonik | Alcohol C12-14, ethoxylated (2-5 EO) + Zn-ricinoleate | 0.50 |
| | Ethanol 96% | Symrise | Ethanol | 20.00 |
| B | Perfume oil E2 from example 13 | Symrise | Perfume | 5.00 |
| | Solubilizer | Symrise | | 3.00 |
| C | Lactic acid | Symrise | Propanoic acid, 2-hydroxy-propionic acid, Lactol | 0.30 |

Method of production: Mix together materials of Part A in the order given. Mix together materials of Part B. When Part A is clear, add Part B. Then add Part C and stir until the mixture is homogeneous.

Example 30: Candle

| Material | wt % |
| --- | --- |
| Candle wax | 95.00 |
| Perfume oil D2 from example 12 | 5.00 |

Method of production: Melt the candle wax and stir. Add the perfume oil, stir well. Cast into the desired shape.

Example 31: WC Block

| Part | Material | Manufacturer | INCI Name | wt % |
| --- | --- | --- | --- | --- |
| A | Imbentin C/125/200 | Dr. W. Kolb AG | C12/15 pareth-20 | 4.00 |
| | Rewomid C 212 | Goldschmidt AG | Cocamide MEA | 6.00 |
| | Marlon ARL | Sasol GmbH | C10-13, ABS-Na, powder | 42.00 |
| B | Sodium sulfate pharm. (E514) | Symrise | Sodium sulfate | 42.00 |
| | Perfume oil F2 from example 14 | Symrise | Perfume | 6.00 |

Method of production: Melt Part A. Mix in Part B in a mixer-kneader. Form in the extruder at 35-40° C. to a WC block.

Example 32: Synthesis of 3-[(4S)-4-isopropylcyclohexen-1-yl]propanal (Ib)

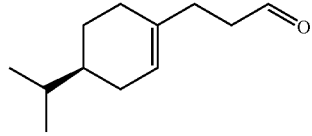

(Ib)

The aldehyde 3-[(4S)-4-isopropylcyclohexen-1-yl]propanal (formula (Ib) as defined above) is produced starting from 1-(−)-limonene (79.5% ee, formula (VIb) as defined above) similarly to the synthesis of 3-[(4R)-4-isopropylcyclohexen-1-yl] propanal (Ia) (examples 4 to 8). The product is obtained with a purity of 97% and with 78% ee.

Example 33: Substantivity

The substantivity test is a test for determining the sensory adherence of a substance on smelling strips. The fragrances to be investigated (compound of formula (Ia), compound of formula (Ib) and Lilial® as benchmark) are each applied in the form of a 10% solution in triethyl citrate (TEC) on a coded smelling strip by dipping and are assessed for intensity at specified time intervals by 15 testers. The 15 testers assess the odor intensity on a scale from 1=odorless to 9=very strong. The results (odor intensity I as a function of the time elapsed t in days d since dipping of the smelling strips) are in shown FIG. 1.

The odor intensity is assessed at the following time intervals after dipping of the smelling strips: 1 hour or less (shown in FIG. 1 as time point "0 days"); 1 day; 2 days; 3 days; 4 days; 7 days; 8 days; 9 days. To ensure that the testers are not influenced, the coded smelling strips are not arranged in a chronological order on the smelling strip stand.

The odor intensity of the compound of formula (Ia) (black filled bar) is assessed in the fresh state and for a period of up to 3 days by the testers in comparison with Lilial® (black cross-hatched bar) as stronger, and after 4 to 7 days at least comparable to Lilial®. After 9 days, a higher odor intensity of the compound of formula (Ia) compared to Lilial® is observed again.

The odor intensity of compound (Ib) (black dotted bar) is, in the fresh state, stronger than that of Lilial® (black cross-hatched bar) and after one day is comparable to Lilial®. After that, the odor intensity of the compound of formula (Ib) at first decreases more than for Lilial® and the compound of formula (Ia), but after 7 to 9 days the values are comparable or slightly higher than with Lilial®.

The invention claimed is:

1. A fragrance preparation comprising a compound of formula (Ia)

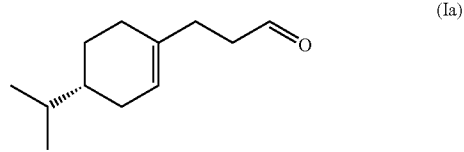

(Ia)

and a compound of formula (Ib)

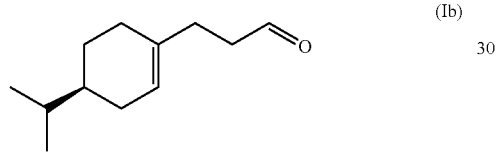

(Ib)

wherein the amount of the compounds of formula (Ia) and (Ib) is in the range from 0.0001 to 40 wt. % relative to the total weight of the fragrance preparation.

2. The fragrance preparation of claim 1, and comprising an additional fragrance with an odor note of lily of the valley.

3. The fragrance preparation of claim 1, wherein
the amount of the compound of formula (Ia) is sufficient to endow the fragrance preparation with an odor note of lily of the valley.

4. The fragrance preparation of claim 1, wherein:
an additional fragrance of the fragrance preparation imparts an odor note of lily of the valley, wherein the amount of the compound of formula (Ia) is sufficient, in comparison with a comparative fragrance preparation of otherwise identical composition without the compound of formula (Ia), to modify and/or to intensify the odor note of lily of the valley.

5. The fragrance preparation of claim 1, wherein
the amount of the compound of formula (Ia) is sufficient to endow the fragrance preparation with an impression selected from the group consisting of natural, caring, complex and radiant.

6. The fragrance preparation of claim 1, wherein
the amount of the compound of formula (Ia) is sufficient to modify and/or to intensify an impression selected from the group consisting of natural, caring, complex and radiant in comparison with a comparative fragrance preparation of otherwise identical composition without the compound of formula (Ia).

7. The fragrance preparation of claim 1, wherein
an amount of the compound of formula (Ib) is sufficient to endow the fragrance preparation with an odor note of lily of the valley.

8. The fragrance preparation of claim 1, wherein
an additional fragrance of the fragrance preparation imparts an odor note of lily of the valley, wherein the amount of the compound of formula (Ib) is sufficient, in comparison with a comparative fragrance preparation of otherwise identical composition without the compound of formula (Ib), to modify and/or to intensify the odor note of lily of the valley.

9. The fragrance preparation of claim 1, wherein
(i) the amount of the compound of formula (Ia) is sufficient to endow the fragrance preparation with an odor note of lily of the valley, and
(ii) an additional fragrance of the fragrance preparation imparts an odor note of lily of the valley, wherein the amount of the compound of formula (Ia) is sufficient, in comparison with a comparative fragrance preparation of otherwise identical composition without the compound of formula (Ia), to modify and/or to intensify the odor note of lily of the valley, and
(iii) the amount of the compound of formula (Ia) is sufficient to endow the fragrance preparation with an impression selected from the group consisting of natural, caring, complex and radiant, and
(iv) the amount of the compound of formula (Ia) is sufficient to modify and/or to intensify an impression selected from the group consisting of natural, caring, complex and radiant in comparison with a comparative fragrance preparation of otherwise identical composition without the compound of formula (Ia), and
(v) the amount of the compound of formula (Ib) is sufficient to endow the fragrance preparation with an odor note of lily of the valley, and
(vi) wherein the amount of the compound of formula (Ib) is sufficient, in comparison with a comparative fragrance preparation of otherwise identical composition without the compound of formula (Ib), to modify and/or to intensify the odor note of lily of the valley.

* * * * *